(12) United States Patent
Li

(10) Patent No.: US 12,496,981 B2
(45) Date of Patent: *Dec. 16, 2025

(54) REAR LOAD CARRIER, CLAMPING DEVICE AND SYSTEM

(71) Applicant: Carman Enterprise Co., Ltd., Hangzhou (CN)

(72) Inventor: Xianwei Li, Hangzhou (CN)

(73) Assignee: Carman Enterprise Co., Ltd. (CN)

( * ) Notice: Subject to any disclaimer, the term of this patent is extended or adjusted under 35 U.S.C. 154(b) by 272 days.

This patent is subject to a terminal disclaimer.

(21) Appl. No.: 18/304,557

(22) Filed: Apr. 21, 2023

(65) Prior Publication Data
US 2023/0398946 A1    Dec. 14, 2023

(30) Foreign Application Priority Data

Jun. 10, 2022 (CN) .......................... 202210655077.7

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC ............. B60R 9/10; B60R 9/06; B60R 9/065
USPC .................................................. 414/462–466
See application file for complete search history.

(56) References Cited

U.S. PATENT DOCUMENTS

| 2,019,636 | A | 11/1935 | Scrantom |
| 4,823,997 | A | 4/1989 | Krieger |
| 5,038,983 | A | 8/1991 | Tomososki |
| 5,586,702 | A | 12/1996 | Sadler |
| 5,690,259 | A | 11/1997 | Montani |
| 5,862,966 | A | * 1/1999 | Mehls ..................... B60R 9/10 |
| | | | 224/527 |
| 5,947,357 | A | 9/1999 | Surkin |
| 6,047,869 | A | 4/2000 | Chiu |
| 6,089,394 | A | 7/2000 | Ziglar |
| 6,152,341 | A | 11/2000 | Lemay |
| 6,168,058 | B1 | 1/2001 | Janek |
| 6,244,483 | B1 | 6/2001 | McLemore |
| 6,491,195 | B1 | 12/2002 | McLemore |

(Continued)

FOREIGN PATENT DOCUMENTS

| CN | 118871323 A | 10/2024 |
| DE | 299 16 746 U1 | 1/2000 |

(Continued)

OTHER PUBLICATIONS

European Search Report dated Oct. 2, 2022, for application No. 22184972.2-1009, 7 pages.

*Primary Examiner* — Lynn E Schwenning
(74) *Attorney, Agent, or Firm* — Thorpe North & Western, LLP

(57) ABSTRACT

The present invention relates to a rear load carrier (1) for mounting to a vehicle, with
a base body (2), which defines a longitudinal direction (L) between its front side and its rear side and a transverse direction (T),
a connecting device (5) for attachment to a vehicle-side trailer coupling provided at the front side of the base body (2), and
fixing means, which are arranged and designed such that different load receiving devices can selectively be attached releasably to the rear load carrier (1).

13 Claims, 20 Drawing Sheets

(56) References Cited

U.S. PATENT DOCUMENTS

Figure 1:
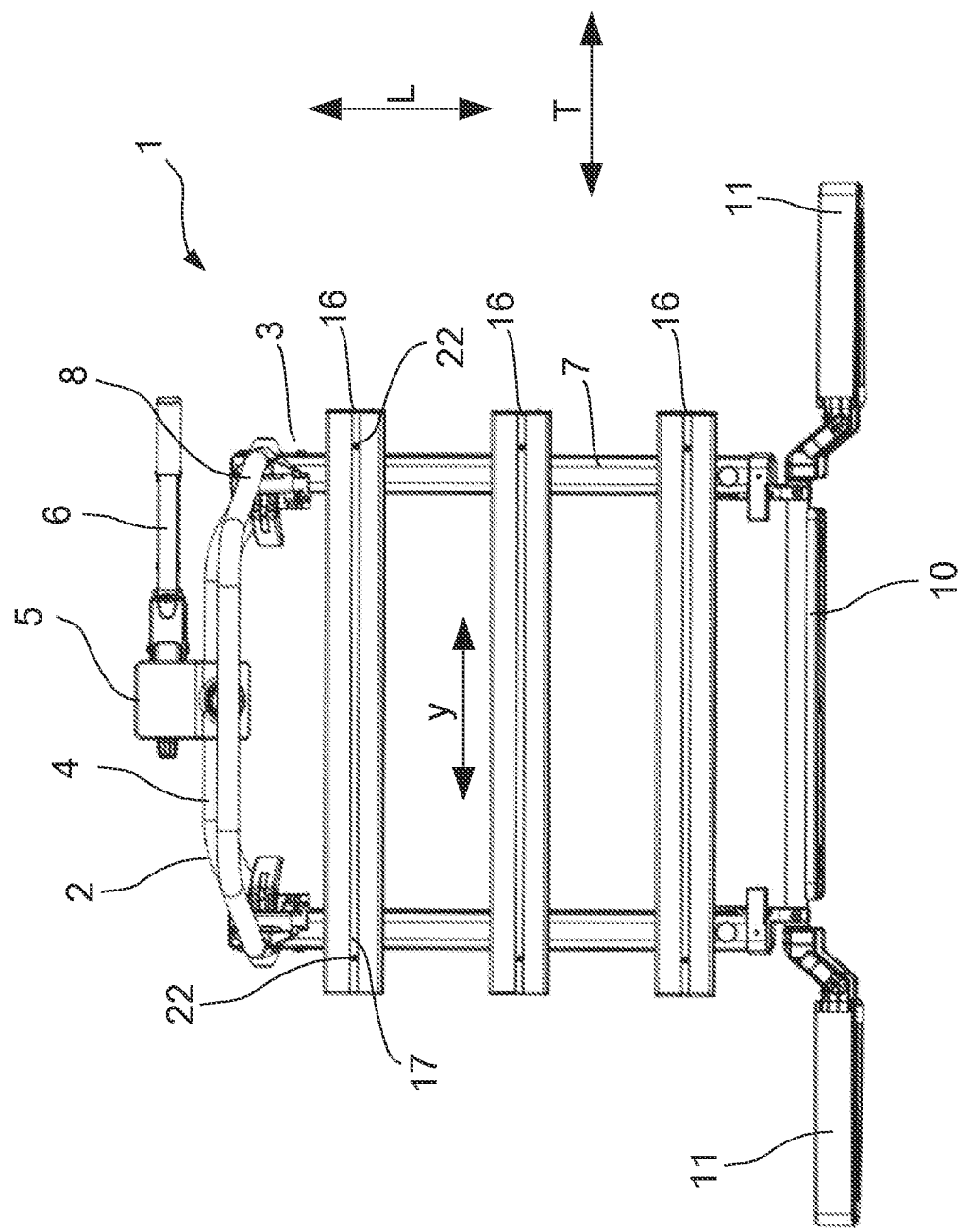

| | | |
|---|---|---|
| 6,539,895 B2 | 4/2003 | Hoagland |
| 6,866,009 B2 | 3/2005 | Smith, Jr. |
| 7,789,044 B2 | 9/2010 | McGrade |
| 8,047,391 B2 | 11/2011 | Lu |
| 8,496,148 B2 | 7/2013 | Farney |
| 8,763,870 B2 | 7/2014 | Davis |
| 9,096,182 B1 | 8/2015 | Roth et al. |
| 10,010,048 B2 | 7/2018 | Kellogg |
| 10,059,276 B2 | 8/2018 | Phillips |
| 10,183,627 B1 | 1/2019 | Liu |
| 10,576,903 B2 | 3/2020 | Rodriguez |
| 10,967,805 B2 | 4/2021 | Wang |
| 11,046,379 B2 | 6/2021 | Tsai |
| 11,148,607 B1 | 10/2021 | Hsieh |
| 11,240,991 B2 | 2/2022 | Zhuo |
| 12,187,236 B2 | 1/2025 | Huo |
| 2003/0132259 A1 | 7/2003 | McLemore |
| 2003/0222112 A1 | 12/2003 | McLemore |
| 2008/0006664 A1* | 1/2008 | Bergerhoff ............... B60R 9/06 224/532 |
| 2008/0142559 A1 | 6/2008 | Lim et al. |
| 2009/0058103 A1 | 3/2009 | Whitney |
| 2009/0229093 A1 | 9/2009 | Zwanenburg |
| 2011/0108592 A1 | 5/2011 | Lee |
| 2011/0132946 A1 | 6/2011 | Sautter |
| 2013/0062383 A1 | 3/2013 | Jeli |
| 2014/0158729 A1 | 6/2014 | Pedrini |
| 2015/0021371 A1* | 1/2015 | Ward .................. B60R 9/06 224/499 |
| 2015/0321620 A1 | 11/2015 | Lungershausen |
| 2016/0068111 A1 | 3/2016 | Walker et al. |
| 2017/0349111 A1 | 12/2017 | Ramsdell |
| 2018/0072237 A1 | 3/2018 | Kuschmeader |
| 2019/0381947 A1 | 12/2019 | Fehr |
| 2021/0170955 A1 | 6/2021 | Nusbaum |
| 2022/0144181 A1 | 5/2022 | Garai Abrisketa |
| 2022/0153205 A1 | 5/2022 | Kuschmeader |
| 2022/0176886 A1 | 6/2022 | Sailer |
| 2023/0398944 A1* | 12/2023 | Li ........................... B60R 9/055 |
| 2023/0398946 A1 | 12/2023 | Li |
| 2023/0398947 A1* | 12/2023 | Li ............................ B60R 9/06 |
| 2023/0398948 A1* | 12/2023 | Li ............................ B60R 9/10 |
| 2024/0253575 A1 | 8/2024 | Nilvius |
| 2024/0351529 A1* | 10/2024 | Li ............................ B60R 9/06 |
| 2024/0399972 A1 | 12/2024 | Willems |

FOREIGN PATENT DOCUMENTS

| | | |
|---|---|---|
| DE | 102 57 903 A1 | 6/2004 |
| DE | 20 2010 016 281 U1 | 2/2011 |
| DE | 10 2010 012 744 A1 | 9/2011 |
| EP | 1502818 A1 | 2/2005 |
| EP | 1 837 240 A1 | 9/2007 |
| EP | 2 338 739 A1 | 6/2011 |
| EP | 3581436 A1 | 12/2019 |
| FR | 2 769 880 A1 | 4/1999 |
| JP | 2010042805 A | 2/2010 |
| JP | 2017-081320 A | 5/2017 |
| KR | 1010 474661 B1 | 12/2014 |
| WO | WO 2013/022671 A1 | 2/2013 |
| WO | WO 2022/064290 A1 | 3/2022 |

\* cited by examiner

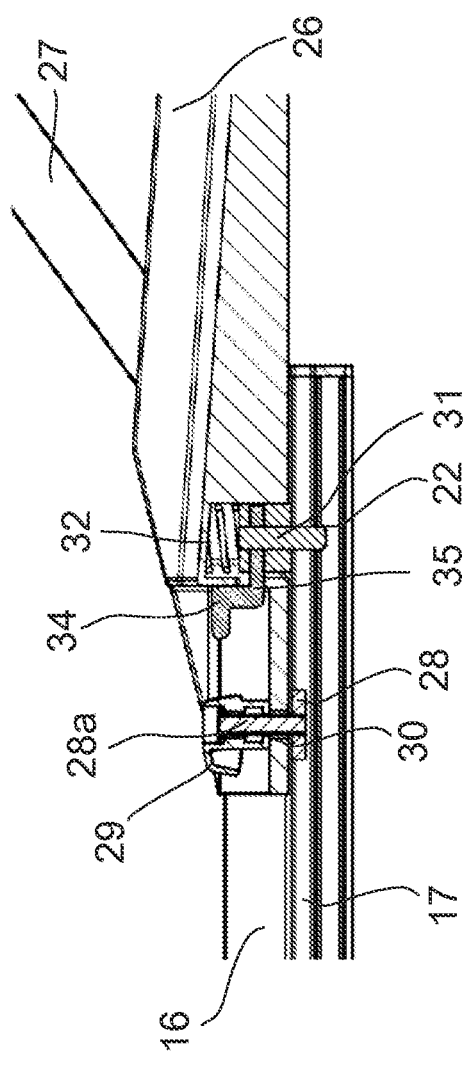
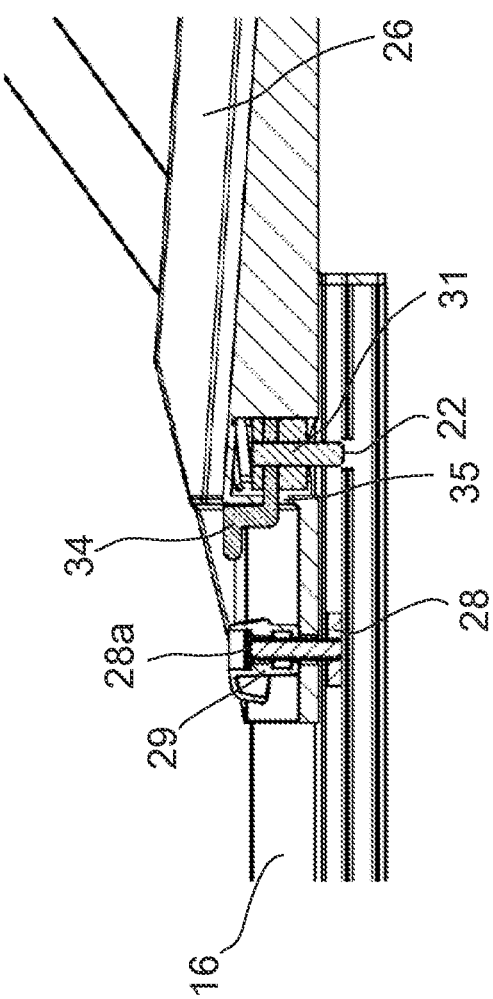

FIG. 16
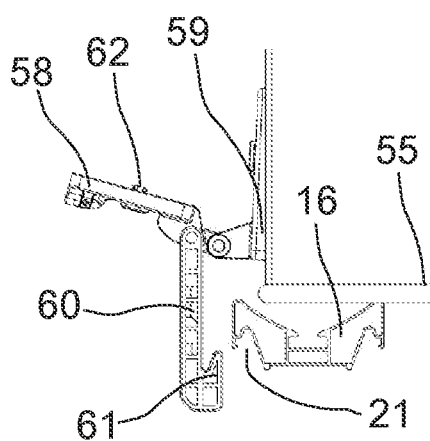
FIG. 18
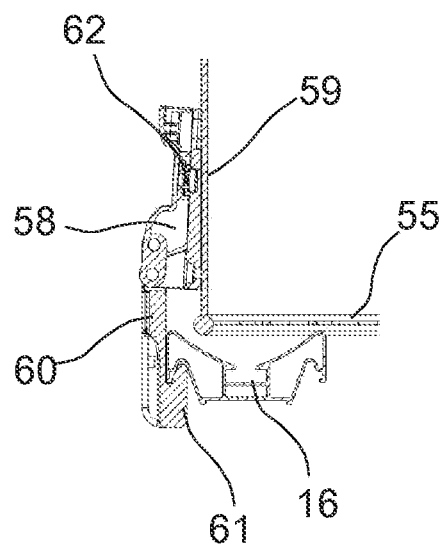
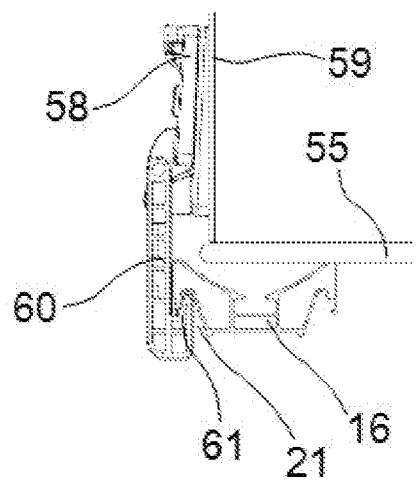
FIG. 17

REAR LOAD CARRIER, CLAMPING DEVICE AND SYSTEM

The present invention relates to a rear load carrier for mounting to a vehicle, with a base body, which defines a longitudinal direction between its front side and its rear side and a transverse direction, and a connecting device for attachment to a vehicle-side trailer coupling provided at the front side of the base body.

Furthermore, the invention relates to a system comprising such a rear load carrier and to a clamping device for bracing a load receiving device to a rear load carrier.

Load carriers for fastening to the rear end of vehicle, in particular a motor vehicle such as a car, are often used for transporting bicycles. Generally, this type of load carrier comprises a connecting device at its front end region which is normally designed so that the load carrier can be fastened to the ball of a conventional trailer coupling. Normally, a plurality of wheel holders is provided such that they can receive the wheels of bicycles in order to fix them at the rear load carrier.

Other load carriers exist, which can be fastened to the rear end of a vehicle and carry a luggage box, by means of which additional luggage which exceeds the capacity of the luggage compartment of a vehicle can be transported. Such a luggage box is normally characterized in that it is closed in order to protect the luggage to be transported against dirt and water, thus defining an interior luggage receiving space.

Furthermore, other types of load carrier exist, for example so called lattice boxes, which are open towards their upper side and which allow to transport goods that have larger dimensions so that they project out of the lattice box.

Such rear load carriers have proven itself in principal. However, it is sometimes considered as disadvantageous that they can only be used for one specific kind of goods, for example bicycles or luggage or other specific goods.

Therefore, it is an object of the present invention to create an alternative rear load carrier, which can be used in a very flexible manner and avoids the above mentioned disadvantages.

This object is solved with a rear load carrier of the type mentioned at the beginning comprising fixing means, which are arranged and designed such that—depending on the load to be transported—different load receiving devices can selectively be attached releasably to the rear load carrier.

Furthermore, the object is solved by a system comprising such a rear load carrier and at least two different load receiving devices, each of which has attachment means corresponding to the fixing means of the rear load carrier so that—depending on the goods to be transported—at least one of the load receiving devices can selectively be attached releasably to the rear load carrier.

The invention is based on the consideration to create a universal rear load carrier, which can be used to transport different kinds of loads. For example, in case that bicycles should be transported, corresponding load receiving devices like wheel holders can be attached to the rear load carrier. Such load receiving devices can be replaced, for example by a luggage box, when other goods should be transported. In other words, the rear load carrier can be flexibly configured with different load receiving devices depending on the goods to be transported. In this way, the rear load carrier is very flexible.

In concrete terms, the fixing means may comprise at least two profile rails which are held on the base body and extend in the transverse direction of the rear load carrier. Accordingly, it may be provided that profile rails are attached to the base body and the profile rails serve as fixing means on which load receiving devices can be attached. Preferably, the profile rails have an identical cross section over their entire length. For example, the profile rails can be made from an extruded aluminium profile.

According to a preferred embodiment, each profile rail may comprise a groove having a T-shaped cross-section extending in the lengthwise direction of the profile rail, which groove is open towards the upper side. Such a T-shaped groove has a bottom groove section which has a larger groove width than an upper groove section so that the bottom groove section undercuts the upper groove section. Accordingly, a slot nut adapted to the width of the bottom groove section can be inserted and can engage behind the upper groove section, in order to fix a load receiving device in a force-fit manner. Preferably, the groove is arranged centrally in the profile rail. In this way, a symmetrical load can be achieved.

Furthermore, the profile rails may have a concave outer contour towards their upper side. In this way, a corresponding forming of a load receiving device can be brought into engagement in this outer contour in order to position a load receiving device on the profile rails.

The profile rails may also comprise on their both lateral sides an engagement groove, in particular having a V-shaped cross-section open towards the bottom, so that corresponding engagement means of a load receiving device can engage behind the profile rails into the engagement groove in order to brace a load receiving device to be attached against the profile rail. Accordingly, another mechanism to brace a load receiving device to the profile rail can be provided. An engagement groove open towards the bottom allows to bring a corresponding engagement profile in engagement so that a load receiving device can be braced against the profile rail.

In order to avoid an unintentional loosening of a load receiving device, safety holes may be provided in the lengthwise end sections of the profile rails, which safety holes extend from the top into the profile rail, in particular from the ground of the T-shaped groove, so that corresponding safety means, for example a safety pin, of a load receiving device to be attached can engage the safety hole in order to lock the load receiving device. For example, it may be provided, that the load receiving device is fixed to the profile rail in a force-fit manner and, in case of an unintentional loosening, the safety means can come into engagement in the safety holes before the load receiving device is completely separated from the corresponding profile rail.

In a further elaboration of the rear load carrier, the profile rails can be held slidingly on the base body between a retracted front position and an extended rear position. In concrete terms, the profile rails may be fixed to two sliding profiles extending in the longitudinal direction, which sliding profiles are in engagement with corresponding base profiles of the base body and are slidingly movable with the respect to the base profiles in the longitudinal direction. This design is based on the consideration to facilitate the access to the rear luggage compartment of a car when the rear load carrier is mounted thereto. Accordingly, the load receiving devices can be moved backwards into an extended rear position so that the rear load carrier, the load receiving devices and the goods, for example bicycles, come out of the movement range of the luggage compartment lid. Arresting means may be provided in order to lock the sliding profiles in the retracted front position. Such arresting means may comprise an arresting pin, which is held at the sliding profile and can be brought into engagement in a corresponding arresting hole formed in the corresponding base profile, when the profile rails are in their retracted front position. In particular, one arresting pin is assigned to each sliding profile.

Preferably, the profile rails are formed as hollow profiles. In this way, the rear load carrier is not very heavy, whereas a high stability of the hollow profiles can be achieved by means of support struts formed inside the profiles. According to a preferred embodiment, the fixing means may comprise exactly three profile rails, which are spaced apart from an adjacent profile rail at a same distance. Furthermore, it may be provided, that the profile rails each have the same length.

In order to further stabilize a load to be transported, the rear load carrier may comprise at its front section a yoke, wherein, in particular, the yoke can be moved relative to the base body between an upright position, in which a connection device for fixing the frame of a bicycle can be attached to the yoke, and at least substantially horizontal position, in which the yoke lies on the base body. It may be provided that the yoke can be locked in both positions.

Regarding the system according to the invention, it may be provided, that at least one of the load receiving devices is a wheel holder for a wheel of a bicycle, which can be releasably attached to the rear load carrier in order to fix a wheel of the bicycle. Accordingly, the rear load carrier can be used to transport bicycles. In concrete terms, a plurality of wheel holders may be used as load receiving devices, in particular two wheel holders may be assigned to each profile rail, in order to support the front wheel and the rear wheel of a bike. In this configuration, the number of bikes to be transported corresponds to the number of profile rails, wherein in particular three profile rails may be provided. Bicycles can additionally be fixed to the load carrier by means of a connection device to be fixed to the frame of a bicycle and to the yoke.

In concrete terms, the wheel holder may be designed such that it can be pushed on an end section of a profile rail of the rear load carrier. In other words, the wheel holder can be attached to the profile rail by means of a translational movement in the lengthwise direction of the profile rail.

The wheel holder may comprise a wheel holder body defining a lengthwise direction, which wheel holder body has a receiving opening open to a proximal end that has a cross-section complementary to the cross-section of the profile rails of the rear load carrier so that the wheel holder body can be pushed with its proximal end on the profile rails and surrounds the profile rail of the rear load carrier at least partially such that the wheel holder is fixed in a form-fit manner perpendicularly to the lengthwise direction of the profile rail. In other words, the wheel holder extending between a proximal and a distal end can have a receiving opening, the inner contour of which is chosen correspondingly to the outer contour of the profile rail such that the wheel holder body can be pushed on one of the profile rails. It is not necessary that the wheel holder body surrounds the profile rail completely. Moreover, it is sufficient if the wheel holder body surrounds the profile rail partially such that the wheel holder body is held on the profile rail perpendicularly to its lengthwise direction in a form-fit manner. Furthermore, the wheel holder body may have an abutment surface which defines an end position of the wheel holder body relative to the profile rail when the abutment surface comes into contact with the end of the profile rail.

The receiving opening may extend through a proximal section of the wheel holder body into the latter and may be open distally. Accordingly, it may be provided that the engagement of the profile rail and the wheel holder body is limited to a proximal section of the wheel holder body. Accordingly, if the wheel holder body is pushed sufficiently on the profile rail, the profile rail of rear load carrier may project distally out of the proximal section as the receiving opening may be formed as a through-opening open distally.

Furthermore, it may be provided that the receiving opening is open towards a bottom side of the wheel holder body. Accordingly, it is not necessary that the wheel holder body surrounds the profile rail completely. Moreover, it is sufficient, if a form-fit engagement is realized in order to securely hold the wheel holder body on the profile rail.

The receiving opening of the wheel holder body may be limited upwards by a convexly shaped wall, which is designed to be brought in engagement with a corresponding concave upper contour of a profile rail of a rear load carrier. In this way, a contact over a large surface between the wheel holder body and a profile rail can be achieved. Correspondingly, the profile rails of the rear load carrier may have a concave outer contour towards their upper side.

Furthermore, engagement projections may be formed at both lateral sides of the receiving opening, which engagement projections engage inwards and upwards so that they can be brought into engagement into corresponding engagement grooves formed in the profile rail of a rear load carrier open downwardly. In other words, the wheel holder body may lay from the top on a profile rail of a rear load carrier and can be secured by engagement projections formed at the lateral sides, which engage inwards and upwards into a corresponding engagement groove of the profile rail. In this way, a safe fixation of the wheel holder body at the profile rail perpendicularly to the lengthwise direction of the profile rail can be achieved.

In order to accommodate the wheel of a bicycle, the wheel holder body may comprise an end section, in which an upwardly open wheel receiving deepening extending in the lengthwise direction for receiving the wheel of bicycle is formed. Furthermore, in a manner known per se, the wheel holder may comprise fastening means in order to fix a wheel of a bicycle. These fastening means may comprise a belt which is or can be attached to the wheel holder body and can be laid around the wheel of a bicycle in order to fix the wheel of a bicycle. Accordingly, the two wheel holders assigned to the profile rail can be positioned relative to each other at a distance such that the wheels of a bicycle fit in the wheel receiving deepenings.

In addition, locking means may be provided by means of which the wheel holder body can be locked relative to the profile rail, in particular in a force-fit manner. In concrete terms, the locking means may comprise a slot nut, which is or can be positioned in the T-groove formed in the profile rail, and a corresponding clamping screw, which is screwed into the slot nut and engages through a through-hole formed in the wheel holder body, so that the wheel holder body can be braced against the corresponding profile rail. In other words, the slot nut can be brought into engagement with the bottom section of the T-shaped groove formed in the profile rail so that—by means of the clamping screw—the wheel holder body can be braced against the profile rail.

According to an alternative embodiment of the locking means, the slot nut may comprise a threaded pin extending upwards, which threaded pin extends through a through-hole formed in the wheel holder body so that the free end of the threaded pin protrudes upwards from the wheel holder body, and a clamping nut is provided which can be screwed on the free end of the threaded pin, so that the profile rail and the wheel holder body can be braced to each other between the slot nut and the clamping nut. The arrangement may be such that the clamping nut is in direct contact with the wheel holder body and the slot nut is in direct contact with the profile rail, in particular with a surface limiting the bottom groove section of the T-shaped groove upwardly when bracing the wheel holder body to the profile rail. The clamping nut may be provided with recesses in its outer contour so that it can be actuated by hand.

Furthermore, safety means may be provided in order to avoid an unintentional separation of the wheel holder from the corresponding profile rail. Such safety means may interact with the safety holes formed in the profile rail. Preferably, the safety means comprise a safety pin, which is moveably held in the wheel holder body between an upper position, in which the safety pin can be out of contact with a corresponding profile rail, and a lower position, in which the safety pin can engage into a safety hole formed in the profile rail, in particular formed in the ground of the T-shaped groove of the profile rail. Accordingly, in case that the locking means loosen unintentionally and, for example due to vibrations while driving on a street, the wheel holder bodies can move relative to the profile rails, the safety means can avoid a complete detachment. When the safety pin reaches the position of a corresponding safety hole formed in the profile rail, the safety pin can come into engagement in order to lock the wheel holder body so that no further movement relative to the profile rail is possible. If two wheel holders are attached to a profile rail and each of the wheel holder bodies carries a wheel of a bicycle, it is sufficient, that the safety means of one wheel holder come into engagement with the safety hole as the other wheel holder is fixedly connected to the wheel holder via the bicycle carried.

In order to ensure an automatic engagement of the safety pin into the safety hole, the safety pin may be biased towards the lower position, in particular by means of a corresponding spring. In order to bring the safety pin intentionally out of engagement of the corresponding safety hole, a manual lever may be fixed to the safety pin in order to move the safety pin in order to move the safety pin by hand. According to a preferred embodiment, it may be provided, that the safety pin is held movably in a corresponding hole formed in the wheel holder body so that the safety pin is protected against external influences and only a manual lever extends through a corresponding lever opening towards the exterior. An upper and a lower end of the lever opening may be designed such that they limit the movement range of the safety pin.

The system according to the invention may further be characterized in that one of the load receiving devices is a luggage box, which can be releasably attached to the rear load carrier in order to transport luggage. Such a luggage box allows to transport additional luggage, which exceeds the capacity of the luggage compartment of a vehicle. The luggage box can generally be open towards an upper side or completely closed in order to protect the luggage to be transported against external influences, in particular against dirt and water.

According to a preferred embodiment, the luggage box may have a rigid bottom element, in particular made of plastic, and the attachment means may comprise at least two, in particular four through-openings formed in the bottom element, which are arranged in such a way that the box can be positioned above the rear load carrier such that the through-openings are located above the T-shaped grooves formed in the profile rails, so that a clamping device can be inserted and can be brought into engagement with the T-shaped grooves of the rear load carrier in order to brace the bottom element of the luggage box against the profile rails of the rear load carrier.

In other words, through-openings are arranged in the bottom element, wherein the distance between the through-openings corresponds to the distance between the profile rails formed in the load carrier. Accordingly, the box can be positioned above the load carrier and clamping devices can be inserted into the through openings engaging into the T-shaped grooves of the rear load carrier. In order to facilitate the positioning of the luggage box relative to the rear load carrier, elongated formings may be formed in the bottom element of the rear load carrier which can be brought into engagement in the concave upper contour of the profile rails.

Preferably, the attachment means device comprise a clamping device assigned to each through-opening. Such a clamping device for bracing a load receiving device to a rear load carrier may comprise a clamping lever, a pivot joint, which is rotatably held at an end section of the clamping lever about a rotation axis, an elongated clamping pin, which is fixed to the pivot joint and extends perpendicularly to the rotation axis of the pivot joint, and a slot nut fixed to the free end of the clamping pin in a rotationally fixed manner, wherein the slot nut has a basically rectangular shape formed such that the slot nut can be inserted into the T-shaped groove when the longer edge of the rectangular shape is oriented in the lengthwise direction and, by rotation about the longitudinal axis of the clamping pin, can be brought into engagement behind the grooves such that the longer edge extends perpendicularly to the lengthwise direction in order to brace a load receiving device to the rear load carrier.

The design of the clamping device is based on the consideration to provide a clamping device as a separate element from the load receiving devices. Due to the rectangular shape of the slot nut, it can be inserted into the T-shaped groove when the load receiving device is already positioned on the load carrier. Accordingly, it can be inserted through the narrow upper groove section when the slot nut is oriented such that the small edge extends perpendicularly to the lengthwise direction. Once the slot nut has reached the wide bottom groove section, it can be rotated such that the slot nut engages behind the upper groove section. In this way, the clamping device can be used to brace the load receiving device to the rear load carrier.

Preferably, the clamping lever may be movable relative to the pivot joint between an insertion position, in which the clamping pin extends at least substantially in the same direction as the clamping lever, and a clamping position, in which the clamping pin extends at least substantially perpendicularly to the direction of the clamping lever. For this purpose, the clamping lever comprises at the end section of the pivot joint a through-slot which divides the clamping lever, so that the elongated clamping pin can rotate freely about the rotation axis of the pivot joint relative to the clamping lever.

In order to clamp a load receiving device to the profile rail, the clamping lever may comprise a clamping surface, which extends parallel to the rotation axis of the pivot joint and is spaced apart from the pivot joint such that load receiving device and the profile rail of the rear load carrier are pressed together between the slot nut and the clamping surface when the clamping lever is moved from its insertion position into the clamping position and the clamping surface comes into contact with a corresponding holding surface of the load receiving device to be attached. In other words, the contact surface of the clamping lever is spaced apart from the pivot joint such that the profile rail and the load receiving device are clamped together between the slot nut and the contact surface of the clamping lever. Accordingly, the distance between the T-shaped groove and the upper side of the load receiving device, for example a holding surface formed in the bottom element of a luggage box, is chosen such that the elements may be pressed together between the slot nut and the clamping surface of the clamping lever. Guiding projections may be formed in the holding surface in order to avoid an unintentional rotation of the clamping device when the clamping lever is in its clamping position and the clamping surface is in contact with the holding surface.

In order to accommodate the clamping lever of the clamping device, when it is brought into its clamping position, a deepening may be provided in the bottom of the luggage box adjacent to each through-opening. The through-opening may be designed such that the slot nut of the clamping device can pass it.

The luggage box may further comprise a rigid cover element and side walls connecting the bottom element and the cover element, thus forming a luggage receiving space inside.

The system according to the invention may further be characterized in that at least one load receiving device is an open lattice box, which comprises attachment means in order to attach the lattice box releasably to the rear load carrier. As already figured out, such a lattice box is normally open towards the upper side and can be used to transport goods that have larger dimensions and cannot be transported in a closed luggage box. In concrete terms, the lattice box may comprise a floor section and a guard railing extending from the floor section.

Preferably, the attachment means comprise at least two, in particular four tensioning devices by means of which the lattice box can be releasably attached to the profile rails of the rear load carrier. In particular, in total four tensioning devices may be provided, wherein two tensioning devices are arranged on the front end in order to attach the lattice box to a front profile rail and two tensioning devices are arranged on the rear end of the lattice box in order to attach the lattice box to a rear profile rail of the rear load carrier. Accordingly, a stable attachment to the universal rear load carrier may be achieved by means of in total four tensioning devices wherein two tensioning devices, respectively, are connected to a front profile rail and to a rear profile rail.

In concrete terms, each tensioning device may comprise a tensioning lever, which is rotatably mounted to a side wall element of the lattice box about an horizontally extending rotation axis, and an engagement element, which is rotatably mounted to the tensioning lever, wherein the rotation axis of the engagement element relative to the tensioning lever is spaced apart from the rotation axis of the tensioning lever relative to the lattice box, wherein the engagement element has an engagement projection, which is formed complementary to the engagement groove of the profile rails of the rear load carrier, so that the engagement projection can engage behind the profile rail from the bottom into the engagement groove in order to brace the lattice box against the profile rails of the rear load carrier. Accordingly, the tensioning device is formed such that an engagement element having a corresponding engagement projection can use the grooves open towards the bottom formed in the profile rails in order to attach the lattice box to the rear load carrier.

The tensioning devices may be designed and arranged such that the tensioning lever extends in a substantially upright position, when the engagement element engages behind the profile rail from the bottom. In this way, the tensioning movement can be easily made by an operator by bringing the tensioning lever from a horizontal or downward position into an upright position. In order to avoid an unintentional loosening, security means may be provided by means of which the tensioning lever can be locked in its upright position, when the engagement element engages behind the profile rail.

It is also conceivable, that the luggage box described above is provided with such external tensioning devices, by means of which the luggage box can be releasably attached to the profile rails of the rear load carrier in the manner described above. Likewise, it is also conceivable that a lattice box comprises through-openings in the floor section and a clamping device as described above in context with the luggage box is assigned to each through-opening so that the lattice box can be releasably attached to the rear load carrier by bringing the slot nuts of the clamping devices into engagement into the T-shaped groove of the profile rails of the rear load carrier.

Furthermore, the system according to the invention may be characterized in that one of the load receiving devices is an extension module for carrying a load, in particular an additional bicycle, which can be releasably attached to the rear load carrier. If, for example, the rear load carrier comprises exactly three profile rails, each of which can be equipped with two wheel holders, a total of three bicycles can be transported. Sometimes, it is considered as disadvantageous, that such a load carrier with additional load receiving devices is limited regarding the number of bicycles to be transported. Accordingly, such an extension module allows to transport at least one further bicycle. Furthermore, it may be provided, that different loads can be transported. For example, in addition to a luggage box attached to rear load carrier, by means of such an extension module, additionally a bicycle can be transported.

Preferably, the extension module comprises one extension profile rail and two extension wheel holders, which are preferably pushed on the free ends of the extension profile rails and fixed thereto. It is possible, that the extension profile rail is designed identically to the profile rails of the rear load carrier. The extension wheel holders can be identical to the wheel holders, which can be pushed on the free end of the profile rails of the rear load carrier and fixed thereto, as described in detail above.

The extension module may comprise at least one, in particular two support elements, wherein one end of each support element is connected to the extension profile rail and the other end comprises attachment means in order to attach the extension module releasably to the rear load carrier. The support elements may be formed as bent profiles, in particular rectangular profiles, which may be made of aluminium or steel. Preferably, the support elements are formed such that the extension profile rail is arranged behind the rear profile rail of the rear load carrier, in particular above the rear light units and/or a license plate holder arranged between the rear light units.

In the free end section of each support element, one through-opening may be provided and a clamping device as described above may be assigned to each support element, so that the free end section of the support element can be releasably braced against the profile rail of the rear load carrier. Accordingly, the clamping device described above may be used to brace the support element against the profile rail of rear load carrier, thus fixing the extension module releasably to the rear load carrier. Accordingly, when attached to the rear load carrier, the extension profile rail is arranged behind the rear profile rail of the rear load carrier. A holding surface may be provided on the top of the support element in the region, where the contact surface of the clamping device comes into contact. As described in the context with the luggage box, guiding projections may be arranged on the holding surface in order to avoid an unintentional rotation of the clamping device when the clamping lever is in its clamping position and the clamping surface is in contact with the holding surface. The holding surface and the guiding projections may be formed by a guide plate arranged on the support element in particular fixed thereto, preferably welded or braized thereto.

In order to ensure a stable fixation to the rear load carrier, an adapter element may be assigned to each support element of the extension module, wherein the adapter element comprises a flat upper surface and a lower surface complementary of the contour of the profile rails of the rear load carrier so that the adapter element can be arranged between the support element and the profile rail of the rear load carrier. In this way, a stable contact over a large surface of the adapter element on the profile rail of the rear load carrier on one hand and of the support element on the adapter element on the other hand can be realized.

The above described system comprising different load receiving devices allows a flexible use of the universal rear load carrier as different kinds of goods can be transported in a very safe manner.

Figure 2:
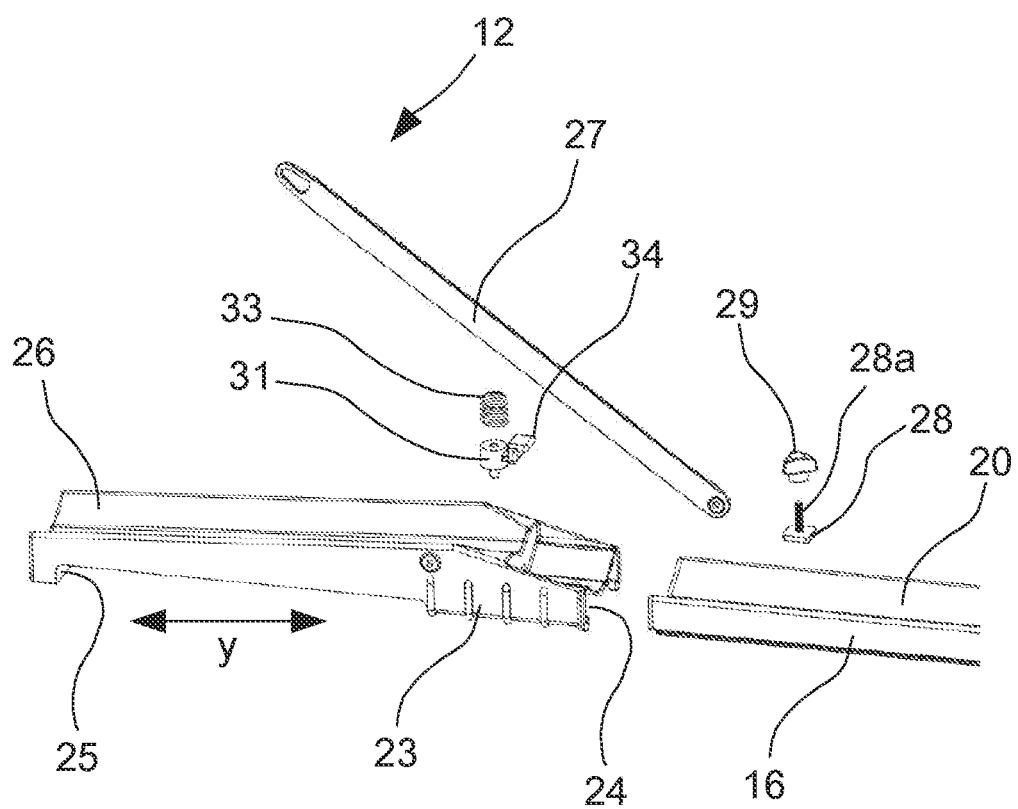
Figure 3:
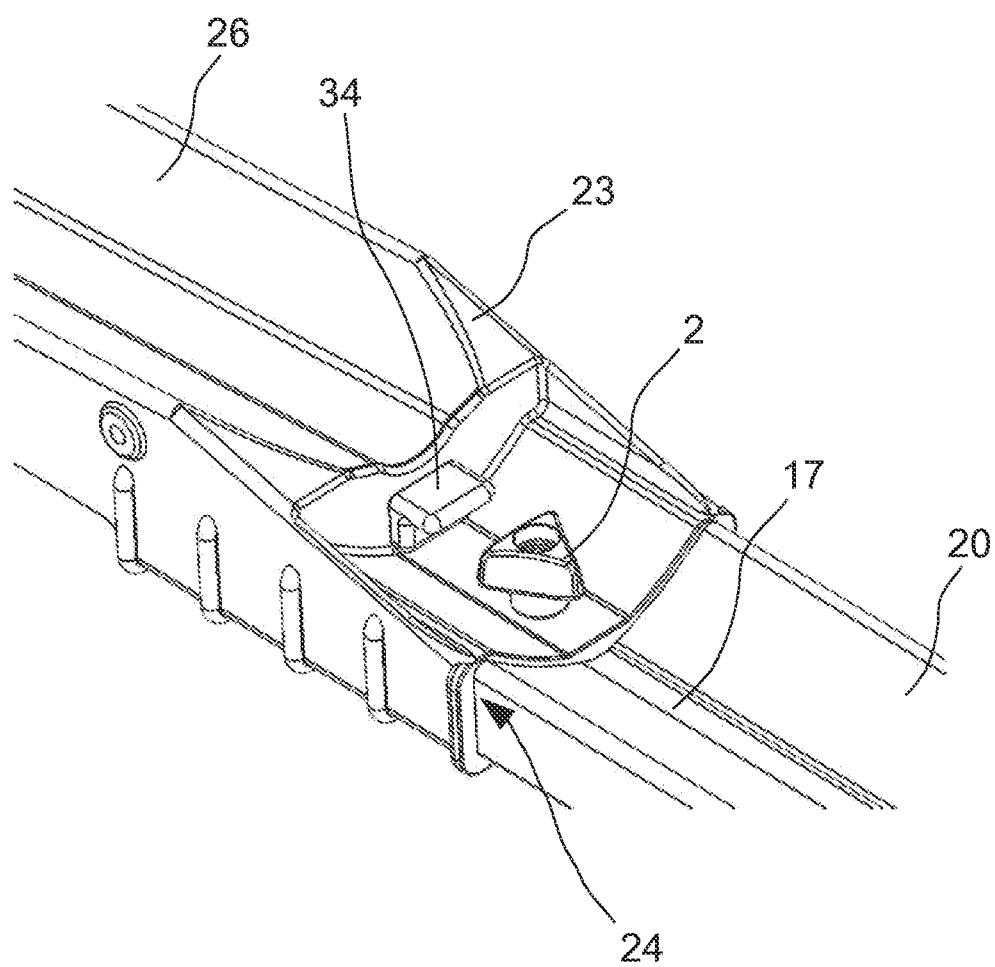
Figure 6:
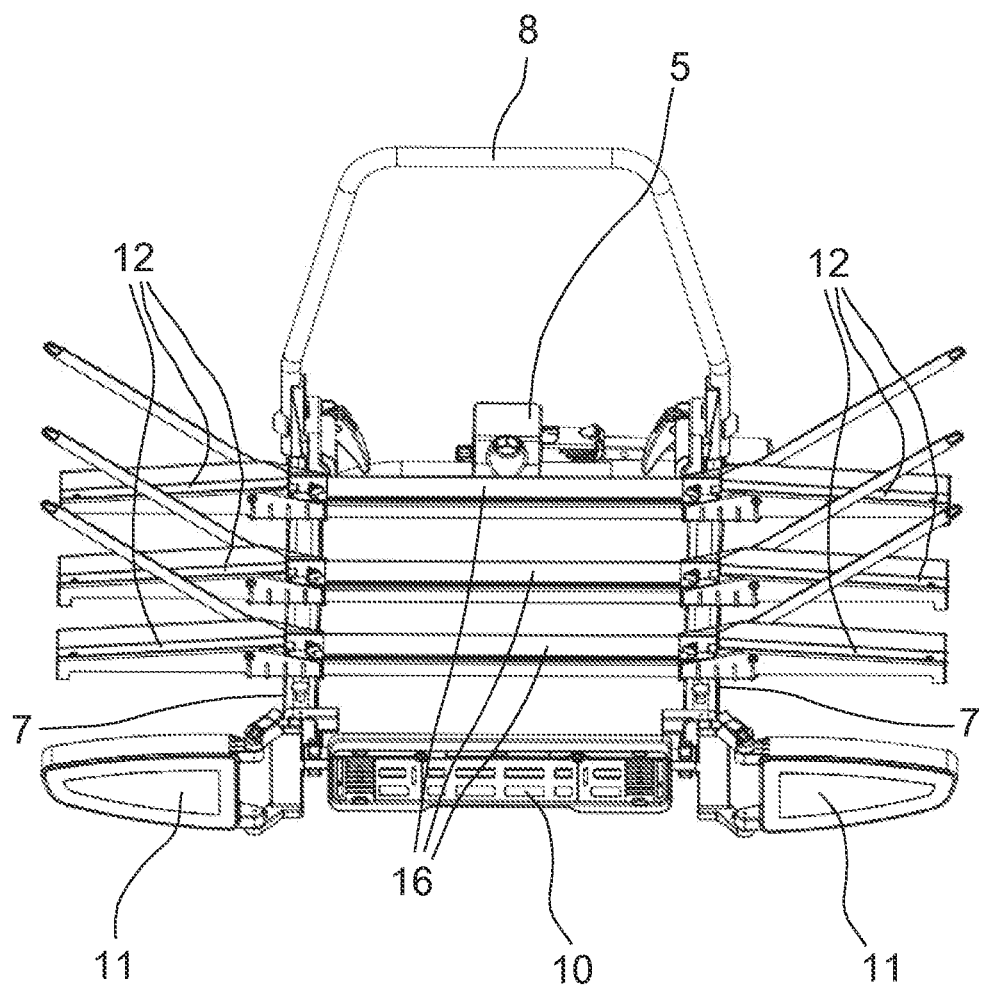
Figure 7:
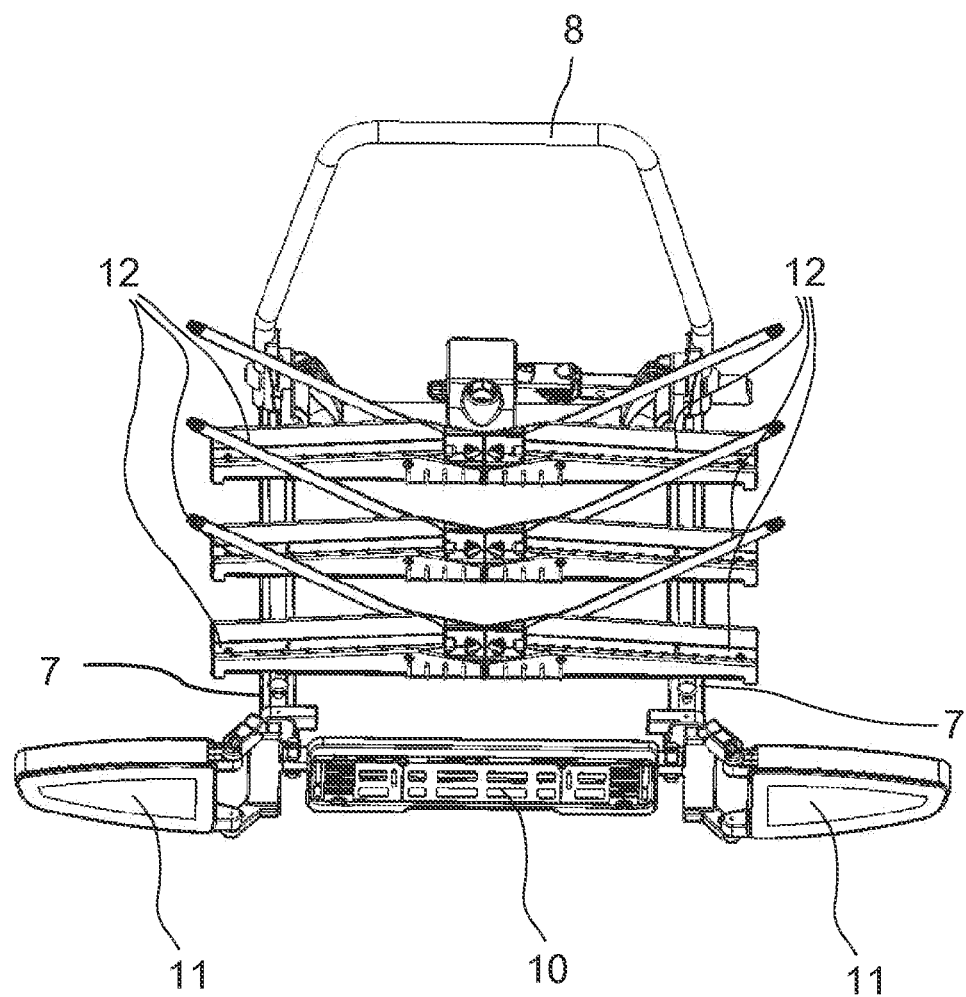
Figure 9:
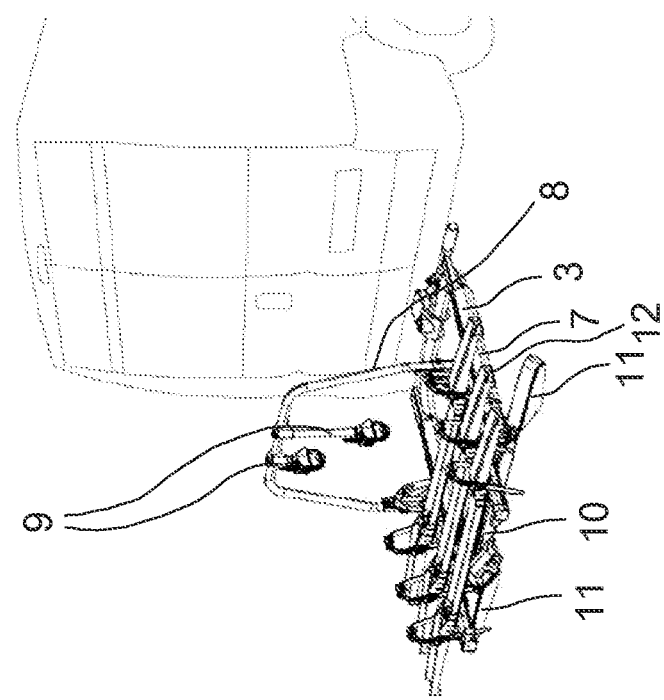
Figure 8:
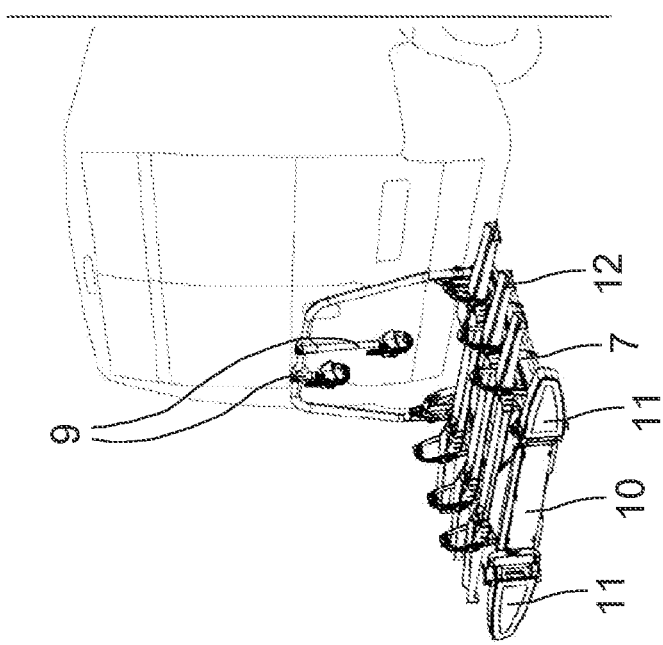
Figure 10:
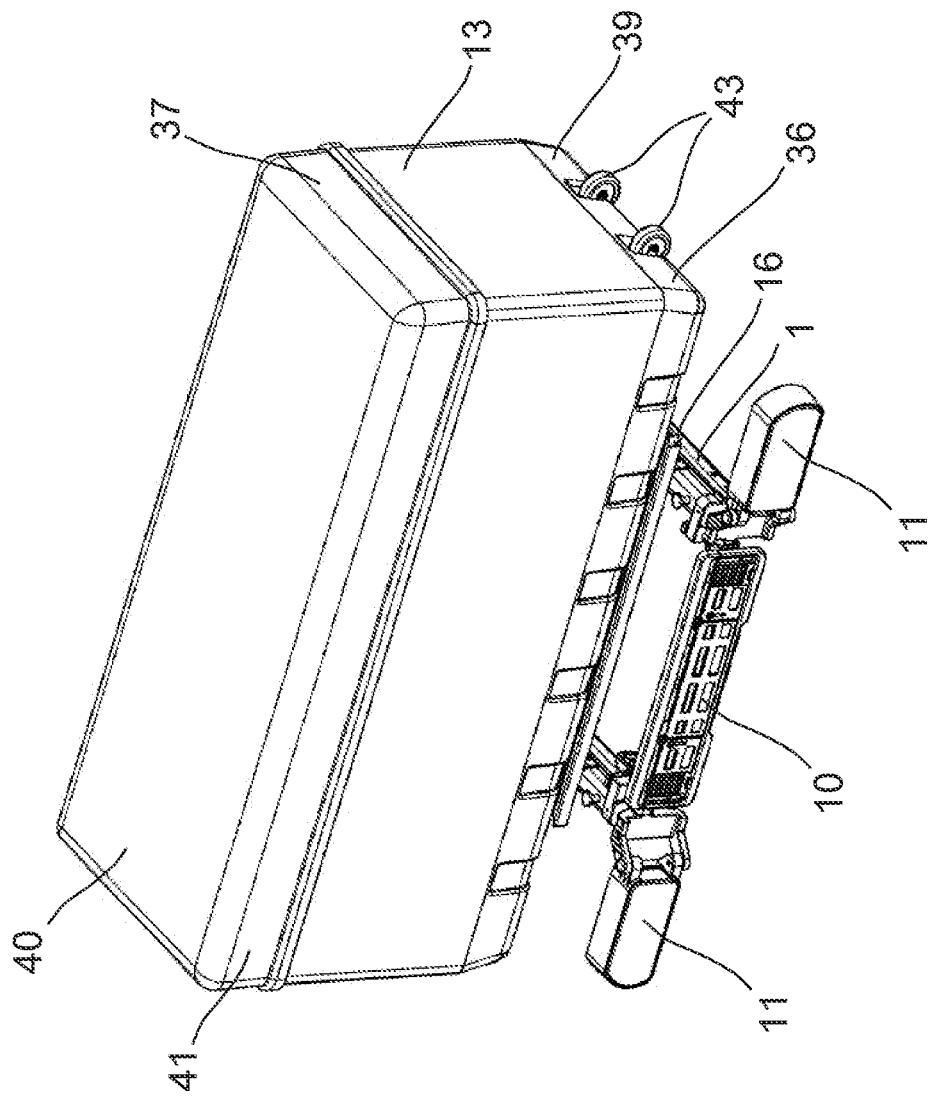
Figure 11:
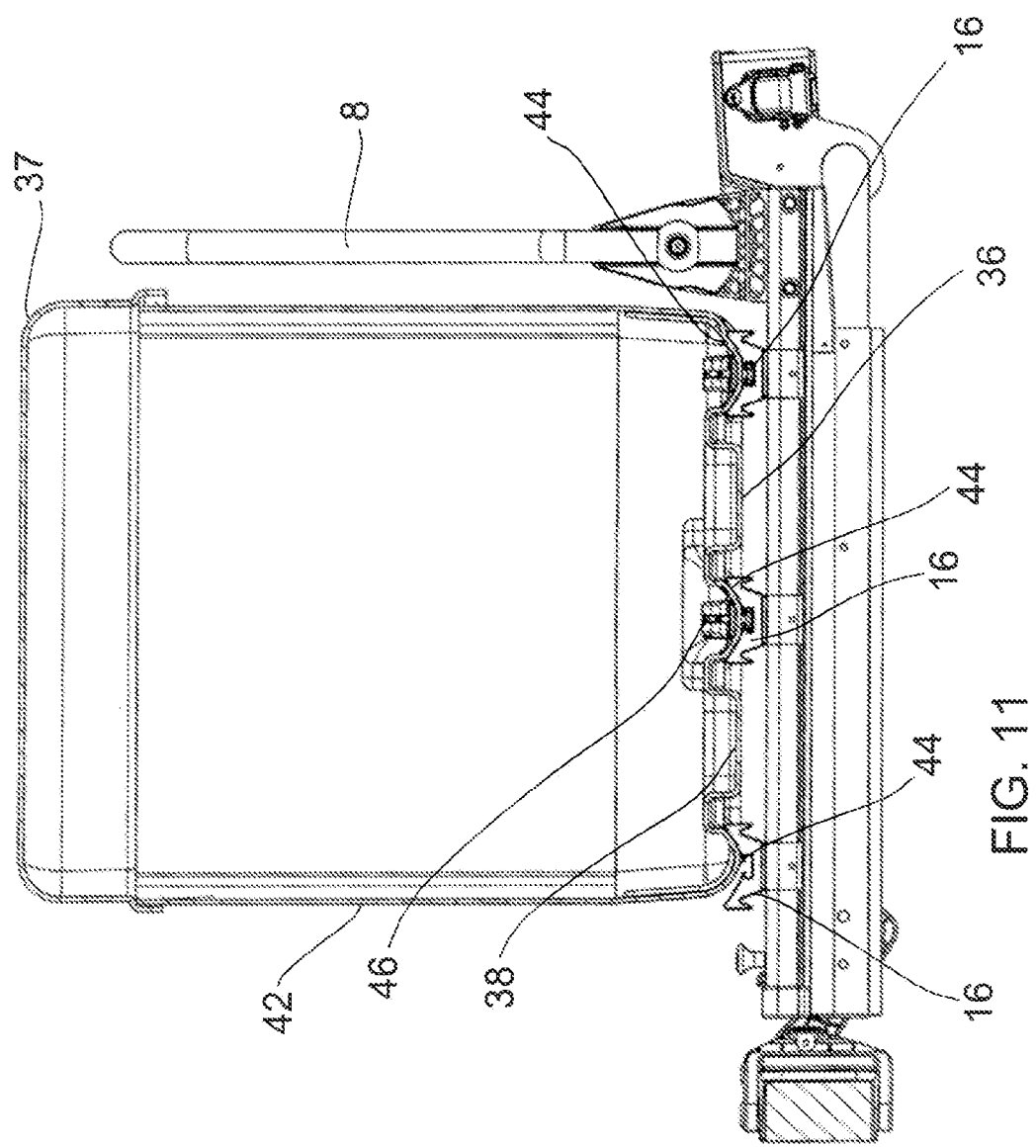
Figure 12:
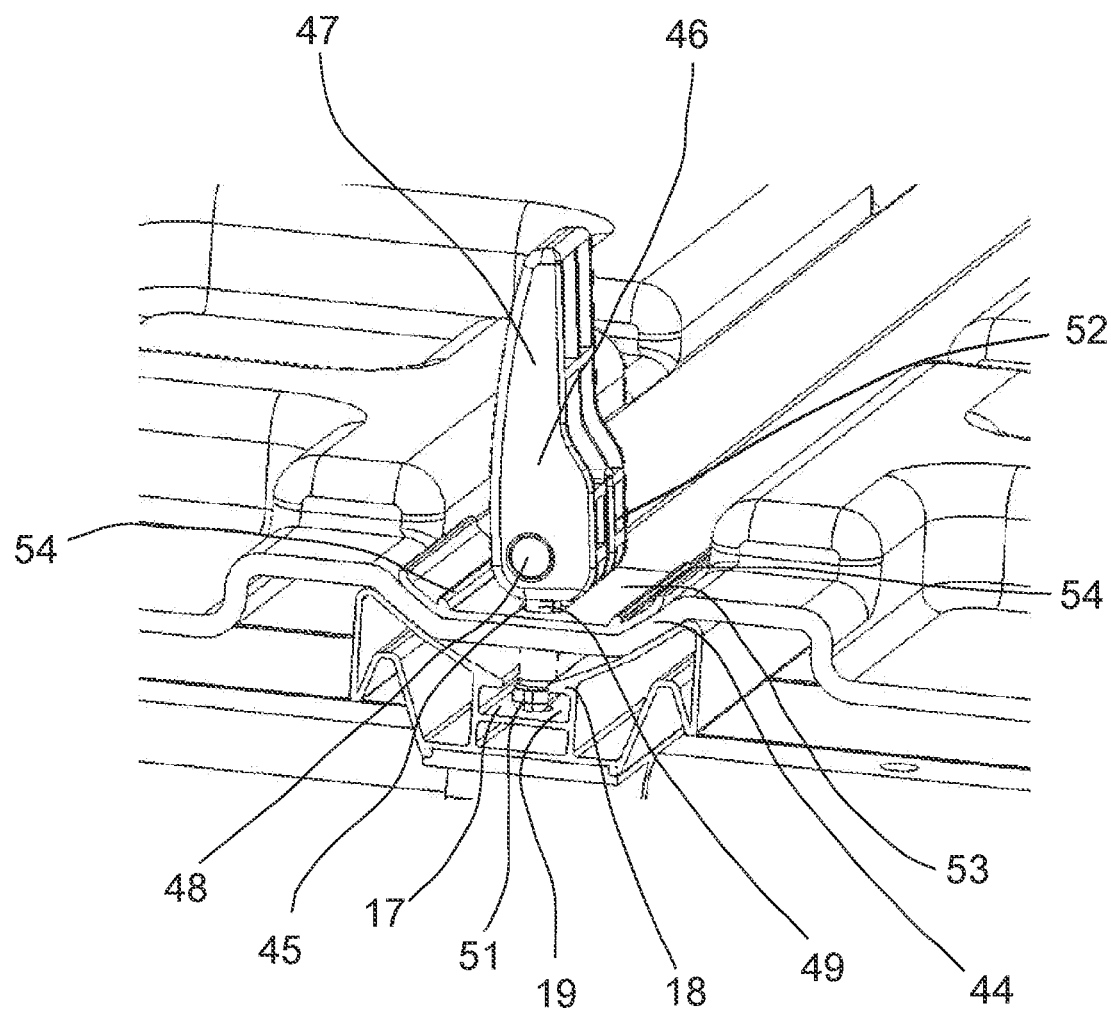
Figure 13:
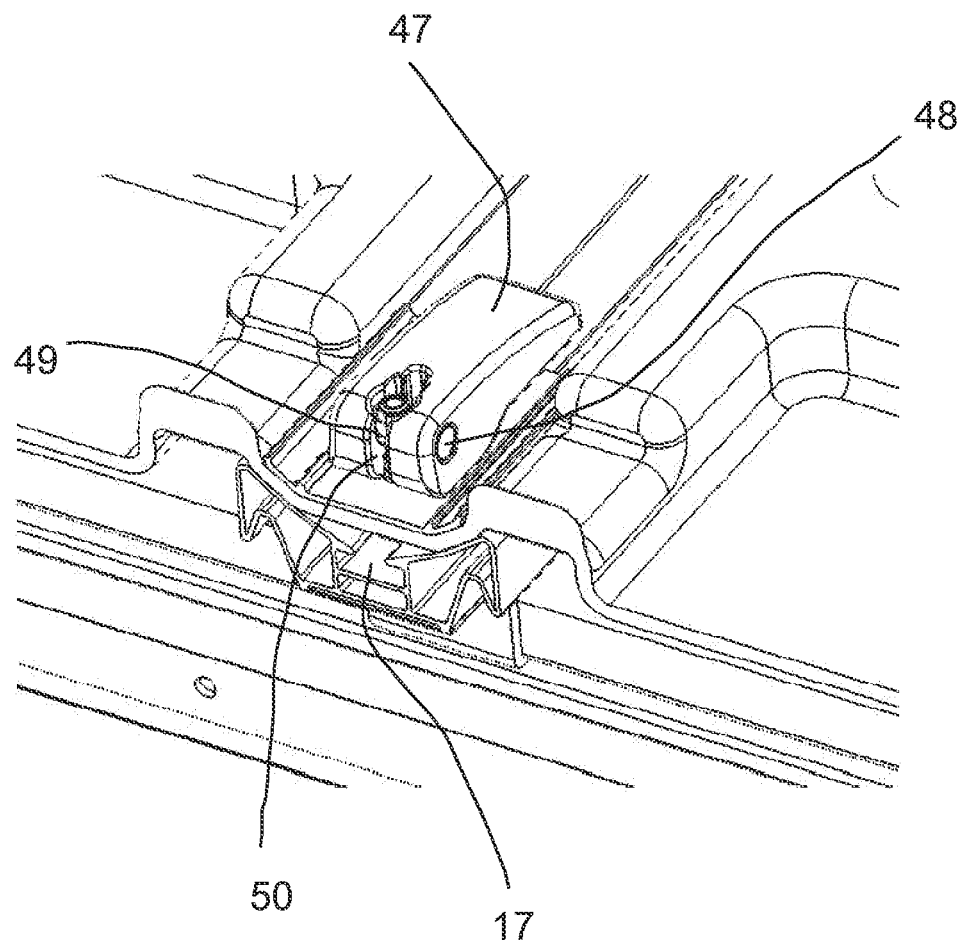
Figure 14:
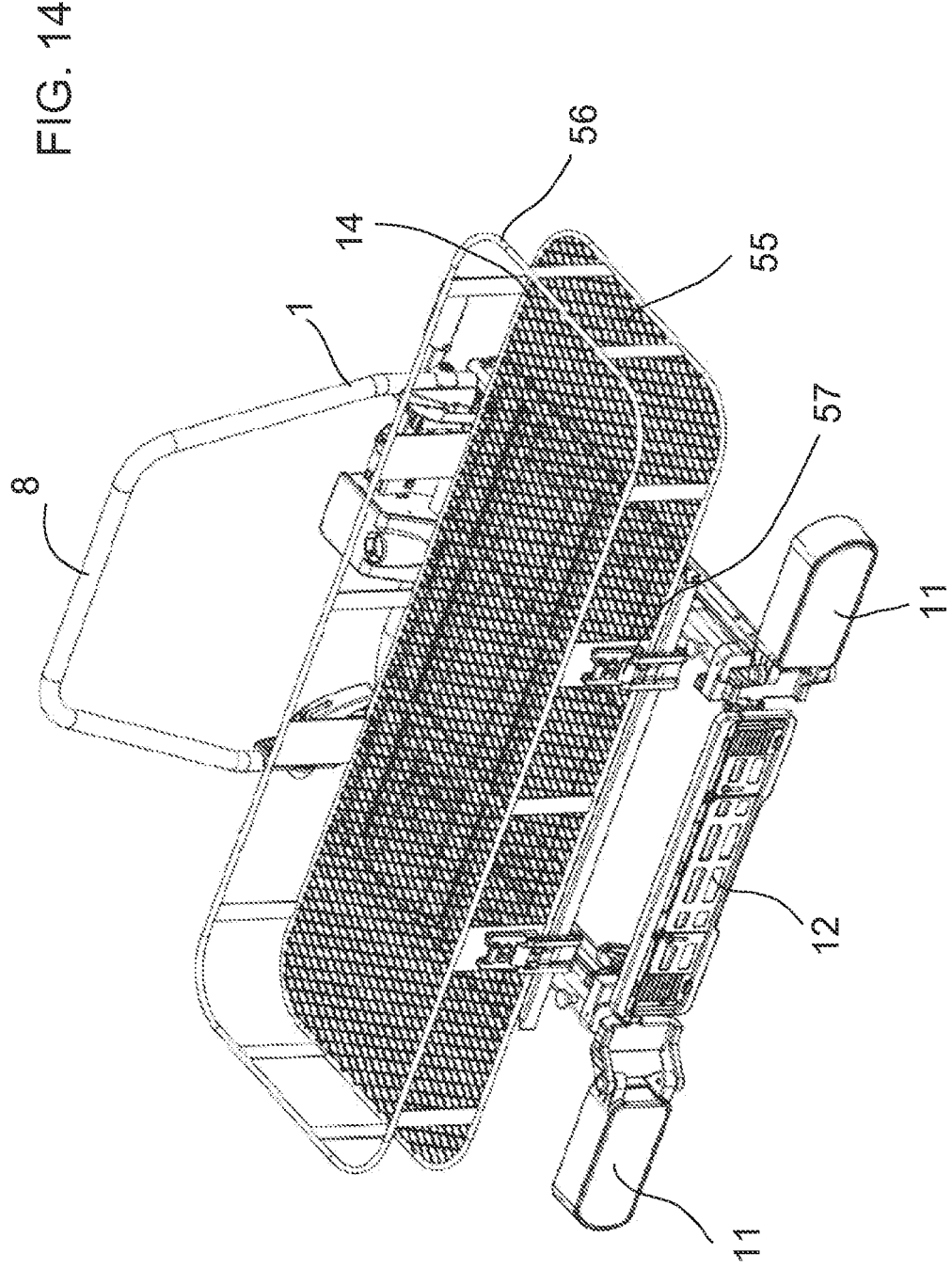
Figure 15:
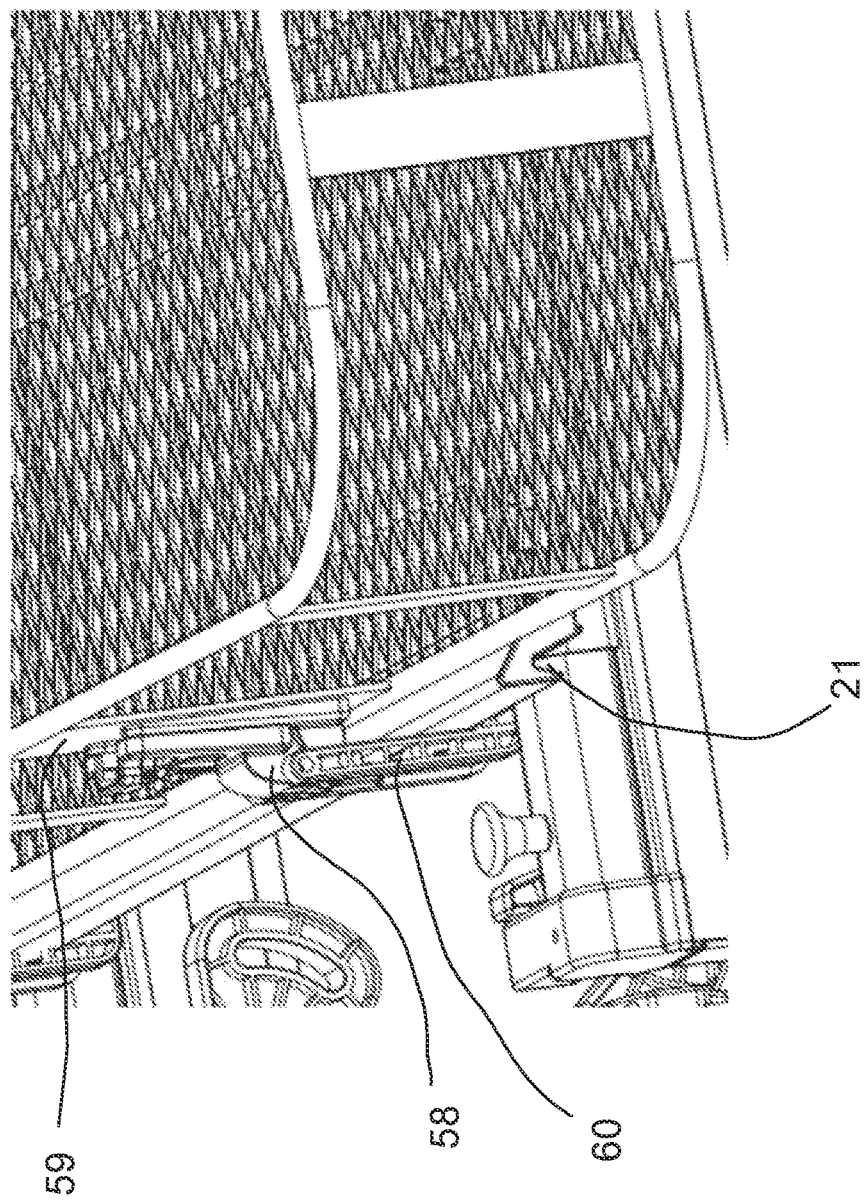
Figure 19:
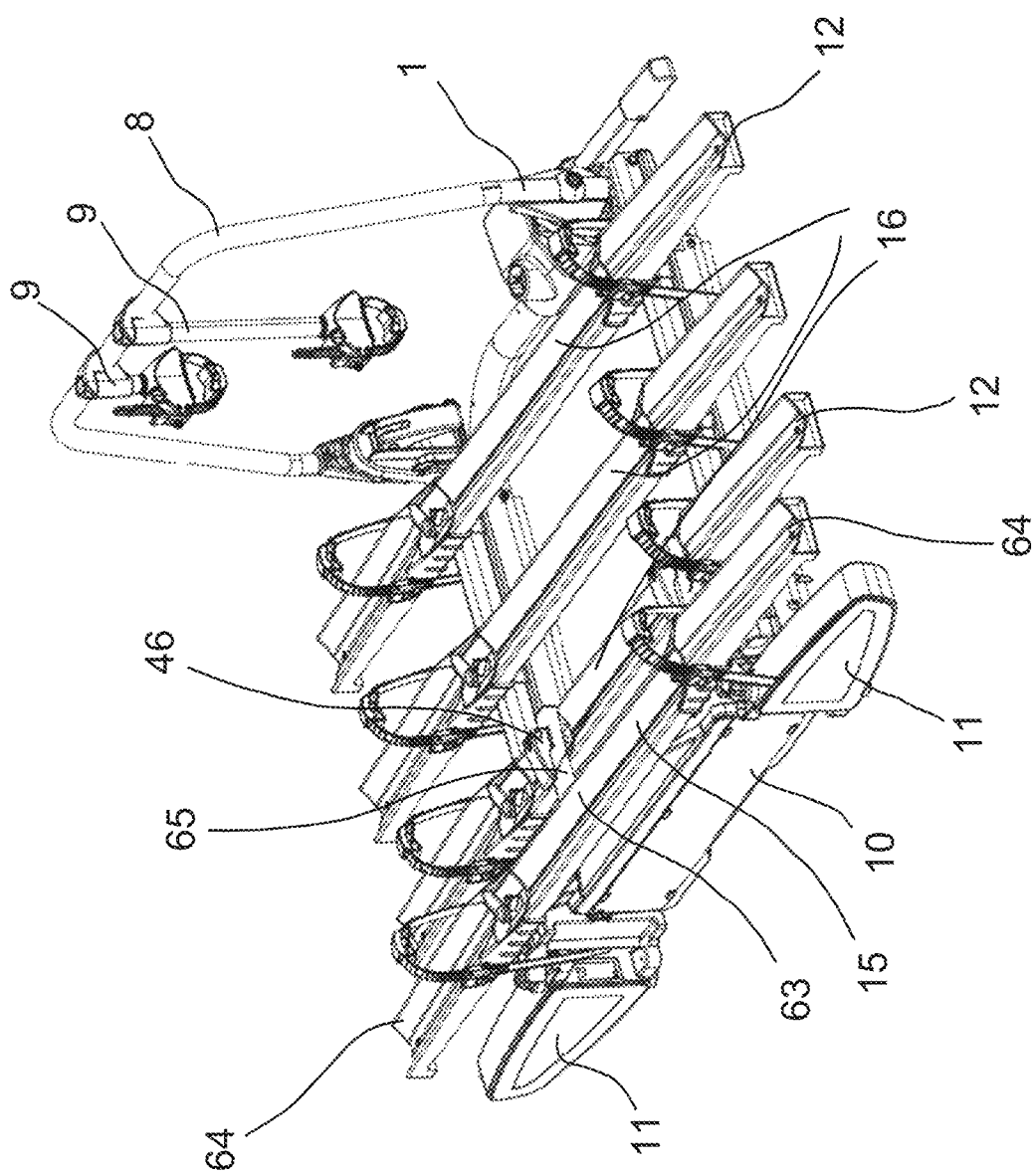
Figure 20:
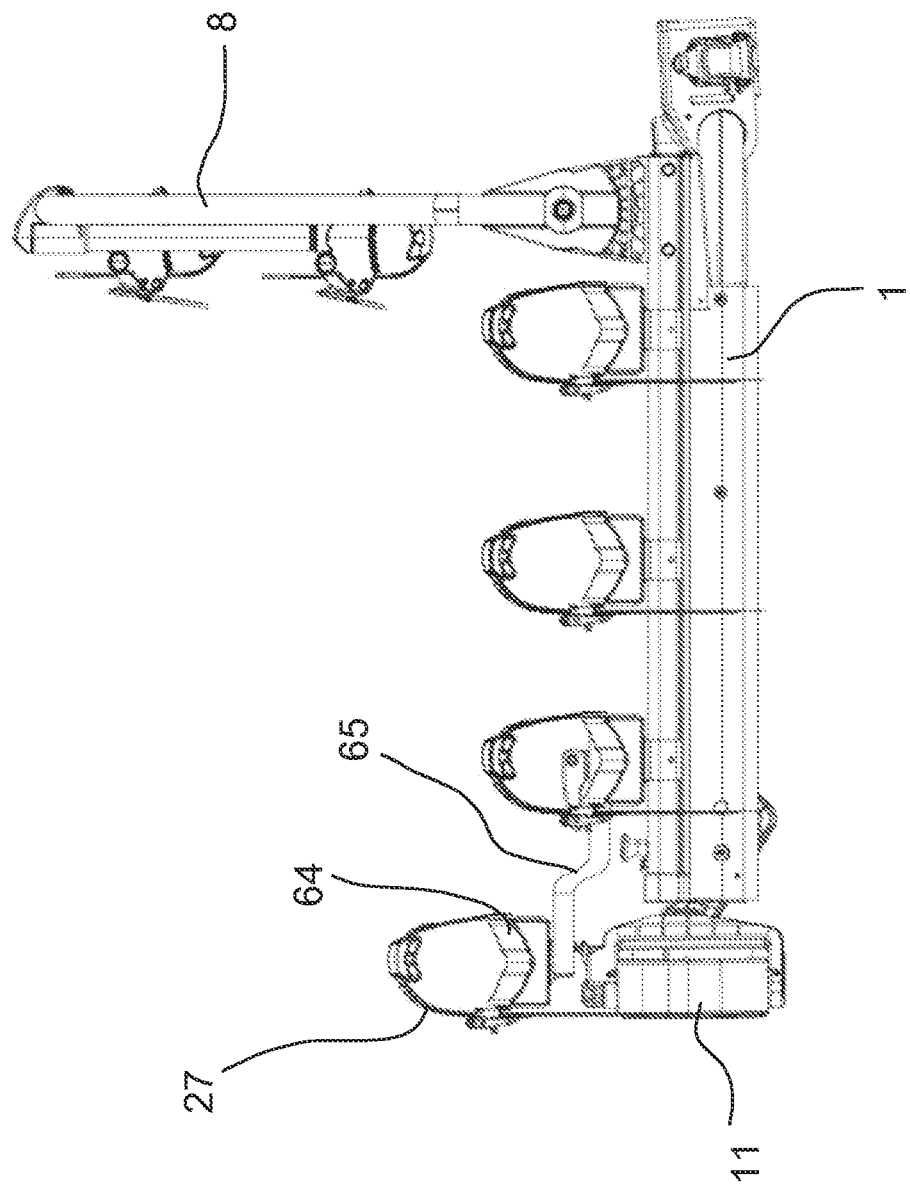
Figure 21:
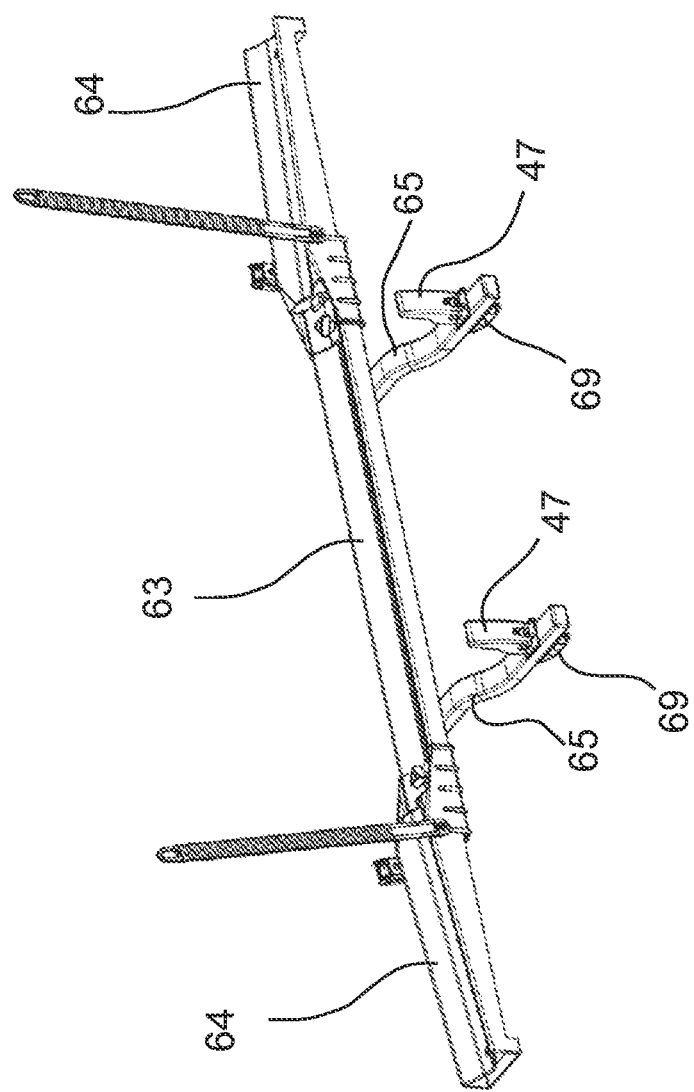
Figure 22:
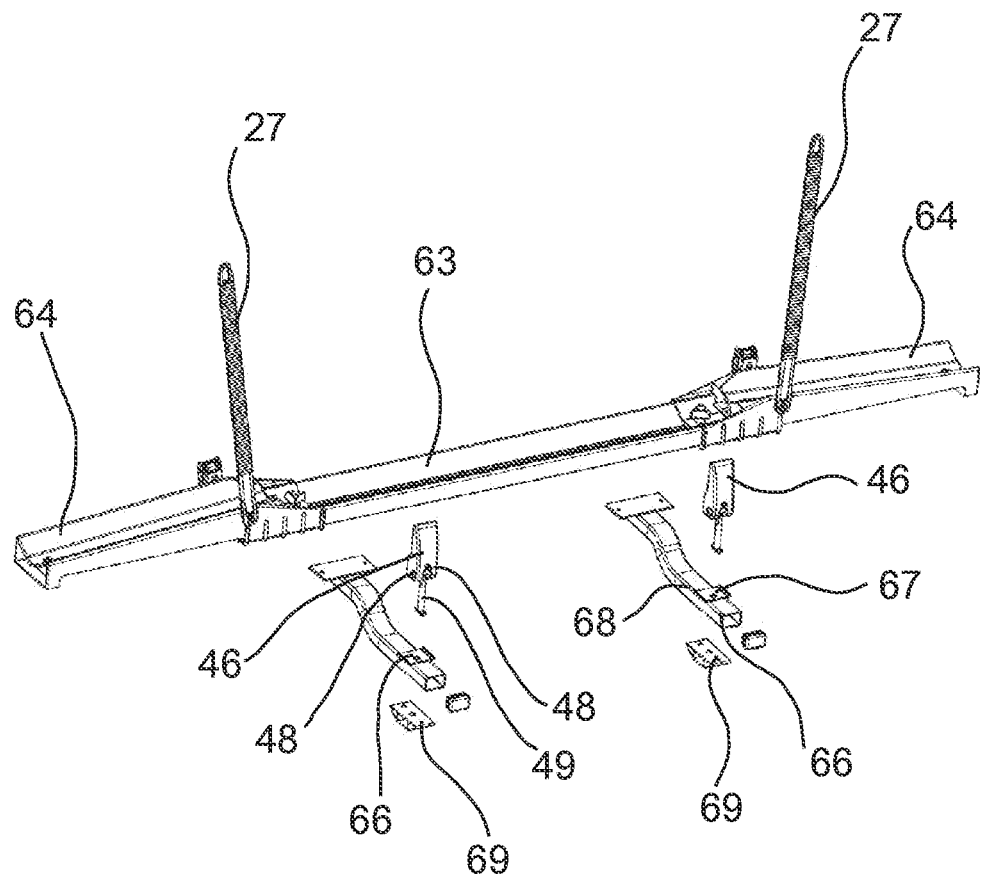
Figure 23:
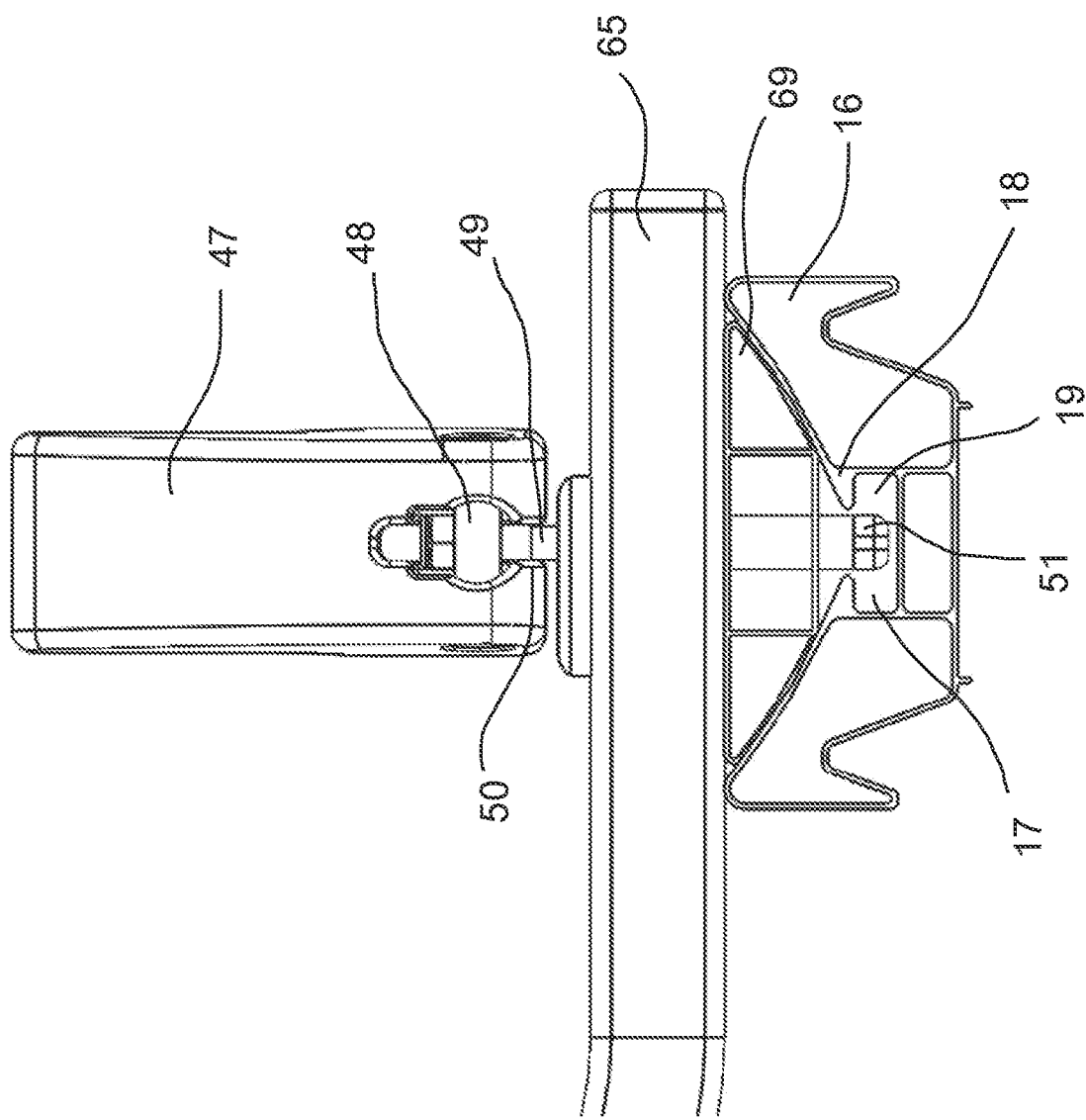
Figure 24:
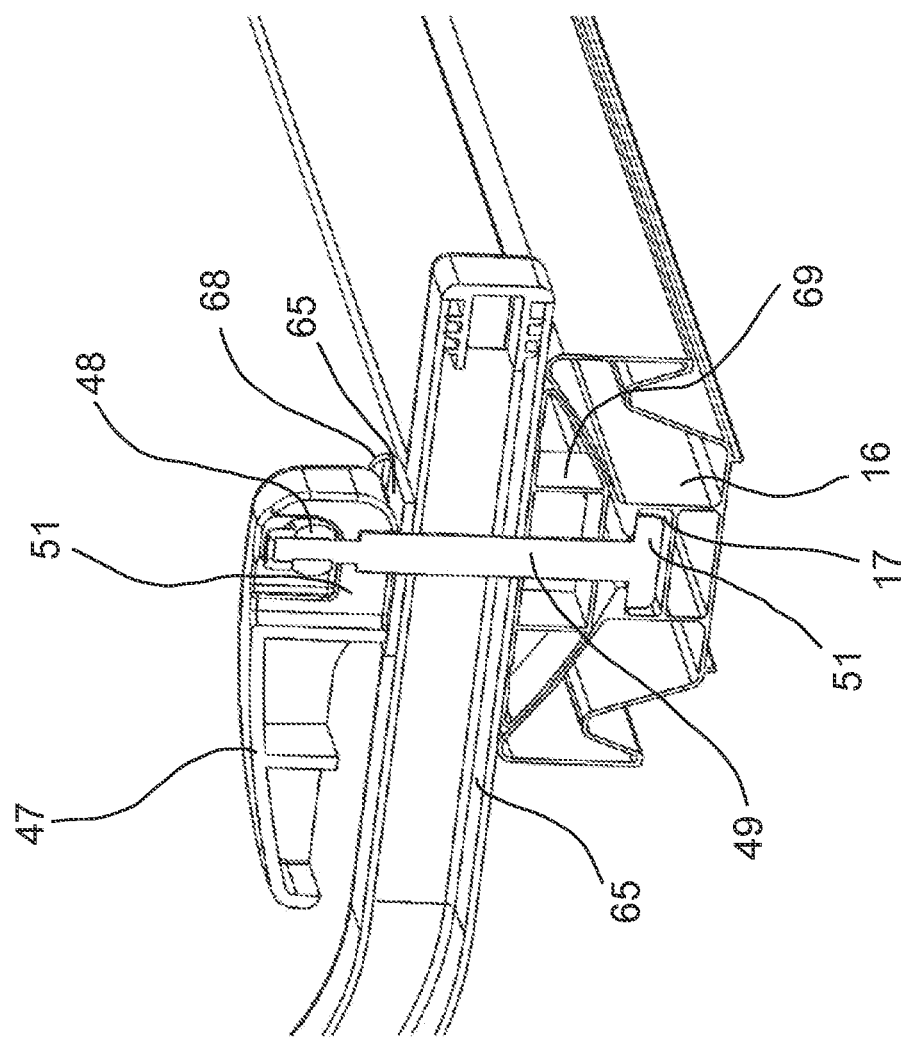

With regard to the embodiment of the invention, reference is also made to the subclaims and to the following description of an embodiment with reference to the attached drawings. The drawings show as follows:

FIG. 1 a rear load carrier according to the invention in a top view;

FIG. 2 a wheel holder for releasable attachment to the rear load carrier of FIG. 1 in an exploded perspective view;

FIG. 3 the wheel holder of FIG. 2 attached to a profile rail of the rear load carrier in a partial perspective view;

FIG. 4 the arrangement of FIG. 3 in a cross-sectional view;

FIG. 5 the wheel holder and a profile rail of the rear load carrier in a cross-sectional view;

FIG. 6 the rear load carrier equipped with six wheel holders in a perspective view;

FIG. 7 the rear load carrier shown in FIG. 6 with the wheel holders in another position in a perspective view;

FIG. 8 the rear load carrier shown in FIGS. 6 and 7 attached to the rear of a vehicle, wherein the profile rails are in their retracted front position;

FIG. 9 the rear load carrier of FIG. 8 wherein the profile rails are in their extended rear position;

FIG. 10 the rear load carrier of FIG. 1 with an attached luggage box in a perspective view;

FIG. 11 the rear load carrier and the luggage box of FIG. 10 in a cross-sectional view;

FIG. 12 the rear load carrier and the luggage box of FIG. 10 in a detailed perspective view, wherein the clamping lever of the clamping device is in its insertion position;

FIG. 13 the arrangement shown in FIG. 12, wherein the clamping lever is in its clamping position;

FIG. 14 the rear load carrier shown in FIG. 1 with an attached lattice box in a perspective view;

FIG. 15 the arrangement shown in FIG. 14 in a detailed perspective view;

FIG. 16 the tensioning device of the lattice box out of engagement from a profile rail of the load carrier in a side view;

FIG. 17 the tensioning device of FIG. 16 in engagement with a profile rail of the load carrier in a side view;

FIG. 18 the tensioning device shown in FIG. 17 in engagement with a profile rail of the rear load carrier in a cross-sectional view;

FIG. 19 the rear load carrier of FIG. 1 equipped with six wheel holders and an attached extension module for transporting an additional bike in a perspective view;

FIG. 20 the rear load carrier shown in FIG. 19 in a side view;

FIG. 21 the extension module of FIGS. 19 and 20 as a separate component in a perspective view;

FIG. 22 the extension module shown in FIG. 21 in an exploded perspective view;

FIG. 23 a detailed side view of the extension module attached to a profile rail of the rear load carrier; and FIG. 24 the arrangement of FIG. 23, wherein the clamping device is in its clamping position, in a cross-sectional perspective view.

FIG. 1 shows a rear load carrier 1 for mounting to a vehicle according to the present invention. The rear load carrier 1 comprises a base body 2, which defines a longitudinal direction L between its front side and its rear side and a transverse direction T. In concrete terms, the base body 2 has the shape of a C open towards the rear side and comprises two base profiles 3 extending in the longitudinal direction L. The base profiles 3 are, at their front end, connected to each other by means of a central section 4 of the base body 2.

At the central section 4, a connecting device 5 for attachment to a vehicle-side trailer coupling is provided. This connecting device 5 comprises an actuating lever 6, which can be pivoted about a pivot axis extending in the longitudinal direction L.

The rear load carrier 1 further comprises two sliding profiles 7, which are in engagement with the base profiles 3 and are slidingly moveable with respect to them in the longitudinal direction L between a retracted front position, which is for example shown in FIG. 8, and an extended rear position as shown in FIG. 9.

Furthermore, at the front end of the sliding profiles 7, a yoke 8 is attached in order to support a load to be transported on the rear load carrier 1. The yoke 8 has the shape of a U open towards the bottom and is attached to the sliding profiles 7 such that it can be moved relative to them between an upright position, which is shown in FIG. 1, and an at least substantially horizontal position, in which the yoke 8 lies on the base body 2. The yoke 8, in its upright position, serves to fix for example the frame of a bicycle to be transported by means of a corresponding connection device 9, which is attached to the yoke 8 in FIGS. 8 and 9.

At the rear end of the base profiles 3, a license plate holder 10 and two rear light units 11 are attached. The rear light units 11 are arranged on opposite lateral sides of the license plate holder 10 and can be pivoted about a vertical pivot axis between a use position, which is shown in FIG. 1 and in which the rear light units 11 are folded out and project in the transverse direction from the base body 2, and a transport position, in which the rear light units 11 are folded in behind the base body 2 and behind the license plate holder 10. A hinge mechanism is provided in order to bring the rear light units 11 and the license plate holder 10 automatically out of the movement range of the sliding profiles 7, when the sliding profiles 7 are moved rearwards out of the retracted front position, as it is visible in FIG. 9.

The rear load carrier 1 also comprises fixing means, which are arranged and designed such that—depending on the load to be transported—different load receiving devices, for example wheel holders 12 to receive wheels of a bicycle (shown in FIG. 2), a luggage box 13 (shown in FIG. 10), a lattice box 14 (shown in FIG. 14) and/or an extension module 15 (shown in FIG. 19) can selectively be attached releasably to the rear load carrier 1.

In concrete terms, the fixing means comprise three profile rails 16 which are fixed to the sliding profiles 7 and extend in the transverse direction T. The three profile rails 16 are each spaced apart from an adjacent profile rail 16 at the same distance and the profile rails 16 have an identical cross-section over their entire, identical length. The profile rails 16 are formed as hollow profiles and comprise a groove 17 having a T-shaped cross section extending in the lengthwise direction of the profile rail 16. The T-shaped groove 17 is open towards the upper side and is arranged centrally in the profile rail 16. This means that the T-shaped groove 17 comprises a narrow upper groove section 18 and a wide bottom groove section 19, so that the bottom groove section 19 undercuts the upper groove section 18, which is visible for example in FIG. 23.

Towards their upper side, the profile rails 16 have a concave outer contour 20 (see FIG. 2), in which the T-shaped groove 17 is arranged centrally. Furthermore, on their both lateral sides, the profile rails 16 comprise an engagement groove 21, which has a V-shaped cross-section open towards the bottom (see FIGS. 16 and 18). The cross-section of both engagement grooves 21 on the lateral sides of the profile rails 16 is formed identically. It may be provided, that corresponding engagement means of a load receiving device can engage behind the profile rails 16 into the engagement groove 21 in order to brace a load receiving device to be attached against the profile rail 16.

In order to avoid an unintended loosening of a load receiving device, safety holes 22 are provided in the lengthwise end sections of the profile rails 16. These safety holes 22 extend from the ground of the T-shaped groove 17 into the profile rail 16 and are presently not formed as through-holes. It is intended, that corresponding safety means of a load receiving device to be attached can engage the safety holes 22 in order to lock the load receiving device and to avoid an unintended loosening.

In FIGS. 2 to 9, an arrangement is shown, in which in total six wheel holders 12 are attached to the profile rails 16 so that the rear load carrier 1 can be used to transport three bicycles. The wheel holders 12 are designed so that they can be pushed on an end section of the profile rail 16 of the rear load carrier 1.

The detailed structure of a wheel holder 12 is shown in FIG. 2. The wheel holder 12 comprises a wheel holder body 23 which defines a lengthwise direction Y. The wheel holder body 23 is an injection moulded plastic part. On the right (proximal) side shown in FIG. 2, the wheel holder body 23 has a receiving opening 24 which has a cross-section complementary to the cross section of the profile rails 16. Accordingly, the wheel holder body 23 can be pushed on the profile rail 16 and surrounds the profile rail 16 partially. In concrete terms, the receiving opening 24 is open towards the bottom wherein the contour of the receiving opening 24 engages into the engagement grooves 21 of the profile rail 16. In this way, the wheel holder 12 is fixed in a form-fit manner perpendicularly to the lengthwise direction of the profile rail 16, but can be moved in the lengthwise direction.

In the left (distal) end section, an abutment protrusion 25 facing downwardly is formed in the wheel holder body 23. Accordingly, the wheel holder body 23 can be pushed on the profile rail 16 until the end of the profile rail 16 comes into contact with the abutment protrusion 25. This configuration is shown in FIG. 7 and allows a space-saving transport of the rear load carrier 1 with attached wheel holders 12.

The wheel holder body 23 comprises in an end section (on the left side in FIG. 2) an upwardly open wheel receiving deepening 26, which extends in the lengthwise direction Y for receiving the wheel of a bicycle.

Furthermore, the wheel holder 12 comprises fastening means in order to fix a wheel of a bicycle. In concrete terms, these fastening means comprise a belt 27 which is, at one end, attached to the wheel holder body 23 and can be laid around the wheel of a bicycle. The other end can be equally fixed to the wheel holder body 23 in order to brace the wheel of a bicycle against the wheel holder body 23. Accordingly, the wheel holders 12 can be positioned on the profile rail 16 relative to each other depending on the distance between the wheels of a bicycle to be transported.

In order to avoid an unintended movement of the wheel holder 12 relative to the profile rail 16, corresponding locking means are provided. For this purpose, the locking means comprise a slot nut 28, which can be positioned in the T-shaped groove 17 of the profile rail 16. The slot nut 28 comprises a threaded pin 28a extending upwards, which threaded pin 28a extends through a through-hole 30 formed in the wheel holder body 23 so that the free end of the threaded pin 28a protrudes upwards from the wheel holder body 23. A corresponding clamping nut 29 is provided which can be screwed on the free end of the threaded pin 28a, so that the profile rail 16 and the wheel holder body 23 can be braced to each other between the slot nut 28 and the clamping nut 29. The clamping nut 29 is provided with recesses in its outer contour so that it can be actuated by hand.

Furthermore, safety means are provided in order to avoid an unintentional separation of the wheel holder 12 from the corresponding profile rail 16. In concrete terms, the safety means comprise a safety pin 31, which is moveably held in a corresponding receiving hole 32 formed in the wheel holder body 23 and open towards the bottom. The safety pin 31 can be moved between an upper position, in which the safety pin 31 is out of contact with a corresponding profile rail (shown in FIG. 5), and a lower position, in which the safety pin 31 can engage into the safety hole 22 as shown in FIG. 4.

It is intended, that the safety pin 31 comes automatically into engagement with the safety hole 22, when the wheel holder 12 moves unintentionally and it is likely that the wheel holder body 23 separates from the profile rail 16. For this purpose, the safety pin 31 is biased towards the lower position by means of a corresponding helical compression spring 33.

In order to bring the safety pin 31 out of engagement from the safety hole 22 against the restoring force of the helical compression spring 33, a manual lever 34 is fixed to the safety pin 31 and extends through a lever opening 35 formed in the receiving hole 32. The lever opening 35 is dimensioned such that the manual lever 34 reaches the upper end (shown in FIG. 5), when the safety pin is out of contact which the profile rail 16, and reaches the lower end of the lever opening 35, when the safety pin 31 is in engagement in the safety hole 22. The safety means ensure that the wheel holder 12 cannot be separated from the profile rail 16 even if the clamping screw 29 and the slot nut 28 loosen so that the force-fit connection fails.

FIGS. 10 to 13 show the rear load carrier with a luggage box 13 releasably attached thereto.

The luggage box 13 has a rigid bottom element 36 made of plastic and a rigid cover element 37 also made of plastic. The bottom element 36 comprises a bottom plate 38 and a circumferential border 39 facing upwards. In the same manner, the cover element 37 comprises a cover plate of a substantially rectangular shape and a circumferential border 41 facing downwards. Furthermore, the luggage box 13 has side walls 42 connecting the bottom element 36 and the cover element 37 thus forming a luggage receiving space inside.

At one end section of the luggage box 13, rollers 43 are provided at the bottom element 36, so that the luggage box 13 can be rolled on the ground.

In FIGS. 10 to 13, the luggage box is releasably attached to the rear load carrier 1. For this purpose, two elongated formings 44 are formed in the bottom element 36 of the luggage box which are in engagement with the concave outer contour 20 of the two front profile rails 16. The elongated formings 44 extend parallel to each other and are spaced apart from each other at the same distance as the distance between two adjacent profile rails 16. In this way, the luggage box 13 is positioned on the rear load carrier 1.

In order to attach the luggage box 13 to the rear load carrier 1, in total four through-openings 45 are formed in the bottom element 36. The through-openings 45 are arranged in such a way that they are located above the T-shaped grooves 17 formed in the profile rails. Presently, two through-openings 45 are located above the T-shaped groove 17 of the front profile rail 16 and two further through-openings 45 are located above the middle profile rail 16.

A clamping device 46 is assigned to each through-opening 45. The clamping device 46 is visible on FIGS. 12 and 13 in detail. It comprises a clamping lever 47, a pivot joint 48, which is rotatably held at an end section of the clamping lever 47. Furthermore, the clamping device 46 comprises an elongated clamping pin 49, which is fixed to the pivot joint 48 and extends perpendicularly to the rotation axis of the pivot joint 48. In order to allow a movement of the elongated clamping pin 49, the clamping lever 47 comprises at the end section of the pivot joint 48 a through-slot 50, which divides the clamping lever 47 so that the elongated clamping pin 49 can rotate freely about the rotation axis of the pivot joint 48 relative to the clamping lever 47.

At the free end of the clamping pin 49, a slot nut 51 is fixed in a rotationally fixed manner.

The slot nut 51 has a basically rectangular shape. The rectangular shape is formed such that the slot nut 51 can be inserted into the T-shaped groove 17 when the longer edge of the rectangular shape is oriented in the lengthwise direction of the T-shaped groove 17. This situation is shown in FIG. 12. By rotation about the longitudinal axis of the clamping pin 49, a slot nut 51 can be brought into engagement behind the groove 17, such that the longer edge extends perpendicularly to the lengthwise direction of the profile rail. This configuration is shown in FIG. 13.

In order to brace the bottom element 36 against the profile rail 16, the clamping lever 47 is movable relative to the clamping pin 49 between an insertion position, in which the clamping pin 49 extends at least substantially in the same direction as the clamping lever 47 (shown in FIG. 12) and a clamping position, in which the clamping pin 49 extends substantially perpendicularly to the direction of the clamping lever 47 (shown in FIG. 13). As it is visible in FIG. 13, the slot nut 51 is arranged relative to the clamping lever 47 such that, when the slot nut 51 engages behind the T-shaped groove 17 of the profile rail 16, the clamping lever 47 extends in the lengthwise direction of the profile rail 16.

The clamping lever 47 comprises a clamping surface 52 which extends parallel to the rotation axis of the pivot joint 48 and is spaced apart from the pivot joint 48 such that the bottom element 36 and the profile rail 16 are pressed together between the slot nut 51 and the clamping surface 52, when the clamping lever 47 is in its clamping position and the clamping surface 52 is in contact with a corresponding holding surface 53 of the bottom element 36, as it is shown in FIG. 13. The clamping lever 47 may be guided by elongated guiding projections 54 protruding upwards from the holding surface 53 in order to avoid an unintentional rotation of the clamping device 46 about the longitudinal axis of the elongated clamping pin 49. In this way, it is avoided that the slot nut 51 comes out of engagement from the T-shaped groove 17 unintentionally.

In FIGS. 14 to 18, an open lattice box 14 is releasably attached to the rear load carrier 1. The lattice box 14 comprises a floor section 55 and a guard railing 56 extending from the floor section 55.

In total four tensioning devices 57 are provided by means of which the lattice box 14 can be releasably attached to the profile rails 16 of the rear load carrier 1. Two tensioning devices 57 are arranged in the front end in order to attach the lattice box 14 to the front profile rail 16 and two tensioning devices 57 are arranged on the rear end of the lattice box 14 in order to attach the lattice box 14 to a rear profile rail 16 of the rear load carrier 1.

In concrete terms, each tensioning device 57 comprises a tensioning lever 58 which is rotatably mounted to a side wall element 59 of the lattice box 14 about an horizontally extending rotation axis.

Furthermore, each tensioning device 57 comprises an engagement element 60, which is rotatably mounted to the tensioning lever 58. The rotation axis of the engagement element 60 relative to the tensioning lever 58 is spaced apart from the rotation axis of the tensioning lever 58 relative to the lattice box 14. The engagement element 60 has an engagement projection 61 which is formed complementary to the engagement groove 21 of the profile rails 16. Accordingly, as it is visible in FIGS. 17 and 18 in detail, the engagement projection 61 can engage behind the profile rail 16 from the bottom into the engagement groove 21 in order to brace the lattice box 14 against the profile rails 16. When the engagement element 60 engages behind the profile rail 16, the tensioning lever 58 extends in a substantially upright position. This mechanism is shown in detail in FIGS. 16, 17 and 18.

Furthermore, security means are provided by means of which the tensioning lever 58 can be locked in its upright position, when the engagement element 60 engages behind the profile rail 16. Presently, a snap mechanism 62 is provided for this purpose.

FIGS. 19 to 24 show an extension module 15 for carrying an additional bicycle, which is releasably attached to the rear load carrier 1.

The extension module 15 comprises an extension profile rail 63 and two extension wheel holders 64. They are pushed on the free ends of the extension profile rail 63. The extension profile rail 63 and the extension wheel holder 64 are designed identically to the profile rails 16 and the wheel holders 12. Accordingly, the mechanism of attaching extension wheel holders 64 to the extension profile rail 63 is identical to the one described above regarding the wheel holders 12 and the profile rails 16.

Furthermore, the extension module 15 comprises two support elements 65 extending parallel to each other. The support elements 65 are made of a bent hollow profile. One end of each support element 65 is connected to the extension profile rail 63, in concrete terms screwed thereto. The other end comprises attachment means in order to attach the extension module 15 releasably to the rear load carrier 1. For this purpose, one through-opening 66 is provided in the free end section of each support element 65 and a clamping device 46 is assigned to each support element 65. The clamping device 46 by means of which the support elements 65 are braced against the rear profile rail 16 of the rear load carrier 1, are nearly identical to the one described above in context with the luggage box 13. Consequently, the slot nut 51 can be brought in engagement into the T-shaped groove 17 of the profile rail 16 and the clamping surface 52 can be brought in contact with a holding surface 67 formed at the top of the support element 65. Similarly to the luggage box 13, guiding projections 68 are formed on the holding surface 67, in order to avoid an unintentional rotation of the clamping device 46.

Contrary to the design of the clamping device 46 shown in context with the luggage box 13, presently the clamping lever 47 extends perpendicularly to the lengthwise direction of the profile rail 16, when the longer edge of the rectangular shape of the slot nut 51 extends perpendicularly to the lengthwise direction in order to brace the support element 65 to the profile rail 16.

The attachment means further comprise an adapter element 69, which is arranged between the support element 65 and the profile rail 16. It comprises a flat upper surface and a lower surface complementary to the concave contour 20 of the profile rails 16. In this way, a stable fixation of the support element 65 on the profile rail 16 can be achieved.

Accordingly, the extension module 15 allows to transport an additional bicycle, wherein the additional bicycle is arranged behind the three profile rails 16.

The system described above comprising the rear load carrier 1, six wheel holders 12, a luggage box 13, a lattice box 14 and an extension module 15 allows to use the rear load carrier 1 to transport different kinds of goods. For example, when a plurality of bicycles should be transported, it would be appropriate, to attach the wheel holders 12 to the profile rails 16. If a fourth bicycle should be transported, the extension module 15 can be attached selectively to the rear load carrier 1. In case that additional luggage, which exceeds the capacity of the luggage compartment of the vehicle, must be transported, the luggage box 13 can—instead of the wheel holders 12—releasably be attached to the rear load carrier 1. If other goods, which extend the dimensions of the luggage box, must be transported, the open lattice box 14 can be attached. It is also conceivable, to attach the luggage box 13 to the rear load carrier 1 in order to transport luggage and, at the same time, attach the extension module 15 to transport an additional bike. In this way, the system described above allows a flexible use of the rear load carrier 1.

LIST OF REFERENCE NUMBERS

1 Rear load carrier
2 Base body
3 Base profile
4 Central section
5 Connecting device
6 Actuating lever
7 Sliding profile
8 Yoke
9 Connection device
10 License plate holder
11 Rear light unit
12 Wheel holders
13 Luggage box
14 Lattice box
15 Extension module
16 Profile rail
17 T-shaped groove
18 Upper groove section
19 Bottom groove section
20 Concave outer contour
21 Engagement groove
22 Safety hole
23 Wheel holder body
24 Receiving opening
25 Abutment protrusion
26 Wheel receiving deepening
27 Belt
28 Slot nut
28a Threaded pin
29 Clamping nut
30 Through-hole
31 Safety pin
32 Receiving hole
33 Helical compression spring
34 Manual lever
35 Lever opening
36 Bottom element
37 Cover element
38 Bottom plate
39 Border
40 Cover plate
41 Border
42 Side walls
43 Roller
44 Elongated formings
45 Through-openings
46 Clamping device
47 Clamping lever
48 Pivot joint
49 Elongated clamping pin
50 Through-slot
51 Slot nut
52 Clamping surface
53 Holding surface
54 Guiding projection
55 Floor section
56 Guard railing
57 Tensioning device
58 Tensioning lever
59 Side wall element
60 Engagement element
61 Engagement projection
62 Snap mechanism
63 Extension profile rail
64 Extension wheel holder
65 Support element
66 Through-opening
67 Holding surface
68 Guiding projection
69 Adapter element
L Longitudinal direction
T Transverse direction
Y Lengthwise direction

The invention claimed is:

1. Clamping device for bracing a load receiving device to a rear load carrier, said clamping device comprising a clamping lever, a pivot joint, which is rotatably held at an end section of the clamping lever about a rotation axis,
an elongated clamping pin, which is fixed to the pivot joint and extends perpendicularly to the rotation axis of the pivot joint, and
a slot nut fixed to the free end of the clamping pin in a rotationally fixed manner,
wherein the slot nut has a rectangular shape formed such that the slot nut can be inserted into a T-shaped groove of the rear load carrier when a longer edge of the rectangular shape is oriented in the lengthwise direction and, by rotation about the longitudinal axis of the clamping pin, can be brought into engagement behind the groove such that the longer edge extends perpendicularly to the lengthwise direction to thereby brace a load receiving device to the rear load carrier,
wherein the clamping lever is moveable relative to the pivot joint between an insertion position, in which the clamping pin extends at least substantially in the same direction as the clamping lever, and a clamping position, in which the clamping pin extends at least substantially perpendicularly to the direction of the clamping lever.

2. System comprising
a rear load carrier for mounting to a vehicle, wherein the rear load carrier comprises
a base body, which defines a longitudinal direction between its front side and its rear side and a transverse direction,
a connecting device for attachment to a vehicle-side trailer coupling provided at the front side of the base body, and
fixing means, which are arranged and designed such that—depending on the load to be transported—different load receiving devices can selectively be attached releasably to the rear load carrier,
wherein the fixing means comprise at least two profile rails, which are held on the base body and extend in the transverse direction, wherein the profile rails are held slidingly on the base body between a retracted front position and an extended rear position,
the system further comprising at least two different load receiving devices, each of which has attachment means corresponding to the fixing means of the rear load carrier so that—depending on the goods to be transported—at least one of the load receiving devices can selectively be attached releasably to the rear load carrier.

3. System according to claim 2, wherein at least one of the load receiving devices is a wheel holder for a wheel of a bicycle, which can be releasably attached to the rear load carrier in order to fix a wheel of a bicycle.

4. System according to claim 3, wherein the wheel holder can be pushed on an end section of a profile rail of the rear load carrier.

5. System according to claim 4, wherein the wheel holder comprises a wheel holder body defining a lengthwise direction which wheel holder body has a receiving opening which has a cross-section complementary to the cross-section of the profile rails of the rear load carrier so that the wheel holder body can be pushed on the profile rail and surrounds the profile rail of the rear load carrier such that the wheel holder is fixed in a form-fit manner perpendicularly to the lengthwise direction of the profile rail.

6. System according to claim 5, wherein locking means are provided by means of which the wheel holder body (23) can be locked relative to the profile rail (16).

7. System according to claim 2, wherein one of the load receiving devices is a luggage box, which comprises attachment means in order to attach the luggage box releasably to the rear load carrier.

8. System according to claim 7, wherein each profile rail comprises a groove having a T-shaped cross section extending in the lengthwise direction of the profile rail, which groove is open towards the upper side, wherein the luggage box has a rigid bottom element, made of plastic, and the attachment means comprise at least two through-openings in the bottom element, which are arranged in such a way that the box can be positioned above the rear load carrier such that the through-openings are located above the T-shaped grooves formed in the profile rails, so that a clamping device can be inserted and can be brought into engagement with the T-shaped grooves of the rear load carrier in order to brace the bottom element of the luggage box against the profile rails of the rear load carrier.

9. System according to claim 2, wherein at least one load receiving device is an open lattice box, which comprises attachment means in order to attach the lattice box releasably to the rear load carrier, wherein the lattice box comprises a floor section and a guard railing extending from the floor section.

10. System according to claim 9, wherein the attachment means comprise at least two tensioning devices by means of which the lattice box can be releasably attached to the profile rails of the rear load carrier.

11. System according to claim 10, wherein the profile rails comprise on their both lateral sides an engagement groove having a V-shaped cross-section open towards the bottom, wherein each tensioning device comprises a tensioning lever, which is rotatably mounted to a side wall element of the lattice box about an horizontally extending rotation axis, and an engagement element, which is rotatably mounted to the tensioning lever, wherein the rotation axis of the engagement element relative to the tensioning lever is spaced apart from the rotation axis of the tensioning lever relative to the lattice box, wherein the engagement element has an engagement projection, which is formed complementary to the engagement groove of the profile rails of the rear load carrier, so that the engagement projection can engage behind the profile rail from the bottom into the engagement groove in order to brace the lattice box against the profile rails of the rear load carrier.

12. System according to claim 2, wherein one of the load receiving devices is an extension module for carrying an additional bicycle, which can be releasably attached to the rear load carrier.

13. System according to claim 12, wherein the extension module comprises one extension profile rail and two extension wheel holders, which are pushed on the free ends of the extension profile rails and fixed thereto, and/or in that the extension module comprises at least two support elements, wherein one end of each support element is connected to the extension profile rail and the other end comprises attachment means in order to attach the extension module releasably to the rear load carrier.

* * * * *